(12) United States Patent
Keller et al.

(10) Patent No.: US 6,473,849 B1
(45) Date of Patent: Oct. 29, 2002

(54) IMPLEMENTING LOCKS IN A DISTRIBUTED PROCESSING SYSTEM

(75) Inventors: James B. Keller, Palo Alto, CA (US); William A. Hughes, Burlingame, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/398,955

(22) Filed: Sep. 17, 1999

(51) Int. Cl.$^7$ .......................... G06F 15/17; G06F 13/40; G06F 13/42
(52) U.S. Cl. .......................... 712/30; 712/29; 709/229; 709/210; 709/216; 709/226
(58) Field of Search .......................... 712/13, 14, 40, 712/41, 18, 26, 29, 30, 33, 32, 227, 226, 224; 709/100, 113, 249, 253, 239, 216, 213, 104, 200, 229, 206, 207, 228, 221, 222, 238, 225, 235, 241, 242, 245, 248, 210, 226; 711/152, 153, 143, 150, 148, 141, 144, 130, 163, 173, 142, 120, 145; 714/5, 43, 45, 4

(56) References Cited

U.S. PATENT DOCUMENTS

| | | | |
|---|---|---|---|
| 5,175,837 A | 12/1992 | Arnold et al. | 711/152 |
| 5,263,146 A | 11/1993 | Mishima | 711/163 |
| 6,044,438 A | * 3/2000 | Olnowich | 711/130 |
| 6,332,180 B1 | * 12/2001 | Kauffman et al. | 711/153 |

OTHER PUBLICATIONS

Intel®, *i960® Processors and Related Products*, "High–Performance 32–Bit RISC Processors for Embedded Application," 1995, pp. 1–338 through 1–341.
Intel®, *Microprocessors vol. I*, 1993, pp. 2–455 through 2–461.
Intel®, *Pentium™ Processor User's Manual vol. 3: Architecture and Programming Manual*, 1993, pp. 25–9 through 25–18 and p. 25–195.
Intel®, *Pentium® Pro Family Developer's Manual vol. 3: Operating System Writer's Guide*, 1996, pp. 7–1 through 7–8 and pp. 15–10 and 15–22.
*Digital 21164 PICMG SBC Technical Reference Information*, Digital Equipment Corporation, Sep. 1997.
*AMD–K6 MMX Processor, Data Sheet*, 1197, Advanced Micro Devices, Inc., pp. 6–32 through 6–35.

* cited by examiner

Primary Examiner—Daniel H. Pan
(74) Attorney, Agent, or Firm—Conley, Rose & Tayon, PC; Lawrence J. Merkel

(57) ABSTRACT

A messaging scheme to synchronize processes within a distributed memory multiprocessing computer system having two or more processing nodes interconnected using an interconnect structure of dual-unidirectional links. The microcode within the lock requesting node transmits a write command to write corresponding node identification data into a lock register in the arbitrating node. The lock requesting node iteratively reads the lock register until it finds its node identification data stored therein with a valid bit set. The lock requesting node then informs all remaining processing nodes to release shared system resources. This is accomplished through a release request bit and a release response bit in each processing node. After completion of lock operations, the lock requesting node sends a message to the arbitrating node to reset the valid bit in the lock register, and a broadcast message to each remaining node to reset the release request bit. In an alternate embodiment, each processing node includes a lock resource register instead of a release response bit. Each remaining processing node writes its node identification data into the lock resource register within the lock requesting processing node when ready to release shared system resources to allow the lock requesting node to establish lock ownership. This informs the lock requesting node to commence lock operations. Lock operations are performed without contention for system resources and without deadlocks among various processing nodes.

54 Claims, 18 Drawing Sheets

| Bit Time | 7 | 6 | 5 | 4 | 3 | 2 | 1 | 0 |
|---|---|---|---|---|---|---|---|---|
| 1 | Command-Specific | | CMD[5:0] | | | | | |
| 2 | Command-Specific | | | | | | | |
| 3 | Command-Specific | | | | | | | |
| 4 | Command-Specific | | | | | | | |

38 ⟶  *Fig. 3A*

| Bit Time | 7 | 6 | 5 | 4 | 3 | 2 | 1 | 0 |
|---|---|---|---|---|---|---|---|---|
| 1 | Command-Specific | | CMD[5:0] | | | | | |
| 2 | Command-Specific | | | | SrcNode[3:0] | | | |
| 3 | Command-Specific | | | | | | | |
| 4 | Command-Specific | | | | | | | |
| 5 | Addr[15:8] | | | | | | | |
| 6 | Addr[23:16] | | | | | | | |
| 7 | Addr[31:24] | | | | | | | |
| 8 | Addr[39:32] | | | | | | | |

40 ⟶  *Fig. 3B*

| Bit Time | 7 | 6 | 5 | 4 | 3 | 2 | 1 | 0 |
|---|---|---|---|---|---|---|---|---|
| 1 | Command-Specific | | CMD[5:0] | | | | | |
| 2 | DestNode[3:0] | | | | Command-Specific | | | |
| 3 | Command-Specific | | | | | | | |
| 4 | Command-Specific | | | | | | | |

| Bit Time | 7 | 6 | 5 | 4 | 3 | 2 | 1 | 0 |
|---|---|---|---|---|---|---|---|---|
| 1 | Data[7:0] | | | | | | | |
| 2 | Data[15:8] | | | | | | | |
| 3 | Data[23:16] | | | | | | | |
| 4 | Data[31:24] | | | | | | | |
| 5 | Data[39:32] | | | | | | | |
| 6 | Data[47:40] | | | | | | | |
| 7 | Data[55:48] | | | | | | | |
| 8 | Data[63:56] | | | | | | | |

| Bit Time | 7 | 6 | 5 | 4 | 3 | 2 | 1 | 0 |
|---|---|---|---|---|---|---|---|---|
| 1 | ByteEn[7:0] | | | | | | | |
| 2 | ByteEn[15:8] | | | | | | | |
| 3 | ByteEn[23:16] | | | | | | | |
| 4 | ByteEn[31:24] | | | | | | | |
| 5 | Data[7:0] | | | | | | | |
| 6 | Data[15:8] | | | | | | | |
| 7 | Data[23:16] | | | | | | | |
| 8 | Data[31:24] | | | | | | | |
| 9+ | Packet may contain up to eight double words of data | | | | | | | |

| CMD Code | Command | Packet Type |
|---|---|---|
| 000000 | Nop | Info |
| 000011 | ValidateBlk | Command/Address |
| 000100 | RdBlk | Command/Address |
| 000101 | RdBlkS | Command/Address |
| 000110 | RdBlkMod | Command/Address |
| 000111 | ChangetoDirty | Command/Address |
| x01xxx | Write(Sized) | Command/Address/Data |
| 01xxxx | Read(Sized) | Command/Address |
| 100xxx | Reserved | |
| 110000 | RdResponse | Response/Data |
| 110010 | TgtStart | Response |
| 110011 | TgtDone | Response |
| 11011x | Reserved | - |
| 111010 | Broadcast | Command/Address |
| 111111 | Sync | Info |

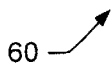

| Bit Time | 7 | 6 | 5 | 4 | 3 | 2 | 1 | 0 |
|---|---|---|---|---|---|---|---|---|
| 1 | Count[1:0] | | \multicolumn{6}{c}{CMD[5:0]} | | | | | |
| 2 | \multicolumn{4}{c}{DestNode [3:0]} | | | | \multicolumn{4}{c}{SrcNode [3:0]} | | | |
| 3 | Rsv | \multicolumn{7}{c}{SrcTag [6:0]} | | | | | | |
| 4 | \multicolumn{6}{c}{Addr[7:2]} | | | | | | Lock | Count[3:2] | |
| 5 | \multicolumn{8}{c}{Addr[15:8]} | | | | | | | | |
| 6 | \multicolumn{8}{c}{Addr[23:16]} | | | | | | | | |
| 7 | \multicolumn{8}{c}{Addr[31:24]} | | | | | | | | |
| 8 | \multicolumn{8}{c}{Addr[39:32]} | | | | | | | | |

| Bit Time | 7 | 6 | 5 | 4 | 3 | 2 | 1 | 0 |
|---|---|---|---|---|---|---|---|---|
| 1 | Reserved | | CMD[5:0] | | | | | |
| 2 | TgtNode [3:0] | | | | SrcNode [3:0] | | | |
| 3 | Rsv | SrcTag [6:0] | | | | | | |
| 4 | Addr[7:3] | | | | | Reserved | | |
| 5 | Addr[15:8] | | | | | | | |
| 6 | Addr[23:16] | | | | | | | |
| 7 | Addr[31:24] | | | | | | | |
| 8 | Addr[39:32] | | | | | | | |

| Bit Time | 7 | 6 | 5 | 4 | 3 | 2 | 1 | 0 |
|---|---|---|---|---|---|---|---|---|
| 1 | Reserved | | CMD[5:0] | | | | | |
| 2 | DestNode [3:0] | | | | SrcNode [3:0] | | | |
| 3 | Rsv/Error | SrcTag [6:0] | | | | | | |
| 4 | Reserved | | Tgt | Reserved | | | | |

| Bit Time | 7 | 6 | 5 | 4 | 3 | 2 | 1 | 0 |
|---|---|---|---|---|---|---|---|---|
| 1 | Count[1:0] | | CMD[5:0] | | | | | |
| 2 | DestNode[3:0] | | | | SrcNode[3:0] | | | |
| 3 | Error | SrcTag[6:0] | | | | | | |
| 4 | Shared | Probe | Tgt | Reserved | | | Count[3:2] | |

123

IMPLEMENTING LOCKS IN A DISTRIBUTED PROCESSING SYSTEM

BACKGROUND OF THE INVENTION

1. Field of the Invention

The present invention broadly relates to computer systems, and more particularly, to a messaging scheme to synchronize processes within a multiprocessing computing environment.

2. Description of the Related Art

Generally, personal computers (PCs) and other types of computer systems have been designed around a shared bus system for accessing a shared memory. One or more processors and one or more input/output (I/O) devices are coupled to the shared memory through the shared bus. The I/O devices may be coupled to the shared bus through an I/O bridge, which manages the transfer of information between the shared bus and the I/O devices. The processors are typically coupled directly to the shared bus or through a cache hierarchy.

FIG. 1A illustrates a shared bus multiprocessor computer system 10 of the prior art. Three processors, 14A through 14C, are shown directly connected to the shared system bus 18. More processors may also be connected in the similar fashion. The system memory 16 (i.e., the shared memory) is shown connected to the system bus 18. Each processor, 14A through 14C, may further have its own local cache, caches 12A through 12C respectively. As used herein, the term "task" refers to a sequence of instructions arranged to perform a particular operation. Application software being executed in the multiprocessing computer system 10 and the operating system for the computer system 10 may each comprise one or more tasks.

One of the major requirements of a shared-memory multiprocessor is being able to coordinate or synchronize processes that are working on a common task. Particularly, access to critical regions of memory 16 accessed by two or more processes must be controlled to provide consistent results in memory transactions. A critical region or a critical section of the memory 16 may contain global variables accessible by each processor in the system. Typically, the critical regions are protected by lock variables (or "semaphores") to synchronize the processes using an atomic swap operation. In an atomic swap operation a processor can both read a memory location and set it to the locked value in the same bus operation, preventing any other processor from reading or writing the shared system memory 16.

FIG. 1B illustrates a simplified flow diagram for locking one or more critical regions using an atomic swap instruction. In a shared bus system, e.g., the system in FIG. 1A, bus arbitration is relatively simple because the shared bus 18 is the only path to the system memory 16. Therefore, the processor that gets the bus may retain control of the bus, thereby locking out all other processors from the memory. When a processor wants to establish a lock, it first reads the lock variable to test its state. The processor keeps reading and testing until the value indicates that the lock is unlocked.

After detecting the state of the lock variable as unlocked, the processor that wishes to lock the variable attempts to do so by executing an appropriate instruction over the shared system bus 18. The instruction may be known as a "test and set" instruction in some instruction sets. A test-and-set instruction has the typical form of read-modify-write, in which the entire process is not interruptible by another processor reading or writing the affected memory location. That is, once it is initiated and the Read access is completed, no other access can be made to the operand until the operand is rewritten during the second step (i.e., the "set" function) of the test-and-set.

In an x86 architecture, a processor may lock the shared system bus 18 using the LOCK prefix in front of an instruction. When an instruction with a LOCK prefix executes, the processor will assert its bus lock signal output. This signal may be connected to an external bus controller (not shown), which then prevents any other processor from taking over the system bus. Thus, a number of shared system resources, e.g., the system memory 16, a disk drive (not shown), etc. may be dedicated to a single processor during execution of the critical code section.

Generally, the skeleton for a program to update a critical region may be given as: LOCK (critical_region); Access (critical_region); UNLOCK(critical_region). A flag or a semaphore may be associated with the critical region. As mentioned earlier, the critical region may typically include memory locations containing shared data, data structure or lock variables. The LOCK and UNLOCK statements operate on the semaphore of the critical region rather than on the content of the critical region. The semaphore permits no more than one process at a time to have access to the critical region. If process A executes the LOCK statement successfully, then all other processes (that require accesses to shared system resources) within the computer system 10 must be halted until process A executes the UNLOCK statement. The LOCK statement can be implemented in part with a test-and-set instruction.

The synchronization of accesses to shared system resources is accomplished by serializing concurrent executions of LOCK instructions by more than one processes. Due to the serial execution of LOCK, no more than one process may observe a zero value (the reset condition) of the semaphore and thereby move past the LOCK to the update stage. Thus, as shown in FIG. 1B, the requesting processor may continue its attempts to lock the variable so long as the semaphore is set (by another processor). When one process passes the LOCK and reaches the UNLOCK, the semaphore can be returned to a 0 state (i.e., the reset condition) and thereby permit another process (which may be executed on another processor) to pass the LOCK statement and update the shared variable.

Once a process (through the corresponding processor) successfully establishes the lock, i.e., succeeds in locking the critical region, that process then operates on the critical region. Upon completion of operation on the critical region, the process unlocks the critical region, for example, by resetting the associated semaphores. This allows the next processor to establish lock ownership and similarly continue lock operations over the lock variables.

Unfortunately, shared bus systems suffer from several drawbacks. For example, since there are multiple devices attached to the shared bus, the bus is typically operated at a relatively low frequency. Further, a shared system bus may not be scaled to include a large number of devices because of the fixed bus bandwidth. Once the bandwidth requirements of the devices attached to the shared bus (either directly or indirectly) exceeds the available bandwidth of the shared bus, devices will frequently be stalled when attempting to access the bus. This results in overall decrease in the system performance.

One or more of the above problems may be addressed using a distributed memory system. In a distributed memory multiprocessing computer system, the shared physical system memory 16 (FIG. 1A) of the prior art may instead get distributed among the processing nodes. Further, the dedicated system bus 18 (FIG. 1A) of prior art may be absent in such a multiprocessing environment. Therefore, it is desirable to provide a mechanism to decide which processor gets the lock so as to synchronize processes within the system without restricting the scalability of the system.

SUMMARY OF THE INVENTION

The problems outlined above are in large part solved by a multiprocessing computer system as described herein. The computer system may employ a distributed system memory and may further include multiple processing nodes. Two or more of the processing nodes may be coupled to separate memories that may form a distributed memory system. The processing nodes may be interconnected using any suitable interconnect. The memory address space is assigned across the memories associated with each node.

In one embodiment, acquisition and release of a lock is arbitrated by a single processing node from the plurality of processing nodes in the multiprocessing system. A first processing node transmits a lock request to a second processing node, which arbitrates such lock requests from each processing node within the system. The second processing node, in turn, determines whether the received lock request is ready for service and, if so, issues a broadcast message to all the remaining processing nodes within the system. The broadcast message thus serves to inform each remaining processing node of the decision by the second processing node to place the lock request from the first processing node into service.

In response to the broadcast message, each remaining processing node sends a target done message to the second processing node (i.e., the arbitrating node) when ready to free all the shared system resources for access by the lock requesting node, i.e., the first processing node. The second processing node, in turn, informs the first processing node of availability of lock ownership by transmitting another target done message to the first processing node.

After completion of lock operations, the first processing node transmits a lock release request to the second processing node. The second processing node again sends a broadcast message to each remaining processing node in the system to inform them of the completion of current lock operations. Each remaining processing node responds to the broadcast message by transmitting a corresponding target done message to the second processing node as an acknowledgment of the receipt of the broadcast message. The protocol is completed when the second processing node sends another target done message to the first processing node after receiving all target done messages from other processing nodes in the system. The messaging scheme according to present invention allows for contention and deadlock free locking within the distributed memory multiprocessing computer system.

In another embodiment, lock functionality is implemented through microcode routines stored within each processing node in the system. Each processing node in the system is capable (through its microcode) of monitoring the arbitrating processing node (here, the second processing node) for availability of lock. A lock register is provided in the second processing node to store the node identification data for a single processing node. A valid bit is also provided in the lock register to indicate whether the node identification data therein is valid or not. The valid bit, when set, may indicate to other processing nodes that the processing node represented by the identification data in the lock register is the current owner of the lock.

The first processing node, i.e., the node desiring lock ownership, sends its node identification data to the second processing node. A buffer may be provided in the second processing node to queue, in a chronological order, identification data received from each lock requesting node. In the event of no pending lock requests, the identification data for the first processing node may be directly placed in the lock register. The first processing node iteratively reads the content of the lock register to ascertain whether its node identification data is in the lock register and whether that data is valid (as indicated by the valid bit). Upon finding its node identification data in the lock register and upon ascertaining its validity, the first processing node transmits a broadcast message to all the other nodes in the system.

Each processing node in the system may be provided with a release request bit. The broadcast message instructs each remaining node to set the corresponding release request bit, thereby informing that node of the claim of lock ownership by the first processing node. A release response bit may also be provided within each remaining processing node in the system. Each remaining processing node sets the release response bit when ready to release its portion of the shared system resources. The first processing node checks status of the release response bit in each remaining processing node, thereby ascertaining when all remaining processing nodes have released the shared system resources. The first processing node, then, proceeds with its lock operations.

In an alternative embodiment, instead of the first processing node ascertaining the status of the release response bit in all the remaining processing nodes, the microcode within each remaining processing node is configured to cause the corresponding remaining processing node to write its identification information into a lock resource register within the first processing node when the remaining node is ready to release shared system resources. When each remaining node writes into the lock resource register, the first processing node gets an indication that it can now proceed with lock operations.

Upon completion of lock operations, the first processing node sends a write command to the second processing node instructing the second processing node to reset the valid bit in the lock register. The first processing node also transmits a broadcast message to all the remaining nodes in the system instructing them to reset respective release request bits. Thus the broadcast message serves to inform all the remaining processing nodes in the system of the completion of lock operations, and, hence, of release of the lock. In one embodiment, the remaining processing nodes respond to the broadcast message by sending a corresponding target done message to the first processing node. In still another embodiment, each remaining processing node may also reset the release response bit along with the release request bit in response to the broadcast message from the first processing node.

The foregoing messaging schemes implement lock functionality in a distributed memory multiprocessor computer system. Contentions for system resources are eliminated through a processing node status reporting mechanism. Microcode implementation of lock acquisition and release may reduce lock management hardware within the multiprocessing environment.

BRIEF DESCRIPTION OF THE DRAWINGS

A better understanding of the present invention can be obtained when the following detailed description of the preferred embodiment is considered in conjunction with the following drawings, in which:

FIG. 3A is a block diagram of one embodiment of an information packet.

FIG. 3B is a block diagram of one embodiment of a command packet.

FIG. 4A is a block diagram of one embodiment of a response packet.

FIG. 4B is a block diagram of one embodiment of a data packet.

FIG. 5 is a block diagram of one embodiment of a data packet in a sized write operation.

FIG. 6 is a table illustrating exemplary packet types that may be employed in the computer system of FIG. 2A.

FIG. 8B is a block diagram of a broadcast packet.

FIG. 8C is a block diagram of a target done packet.

DETAILED DESCRIPTION OF THE PREFERRED EMBODIMENT

Overview

Figure 1A:
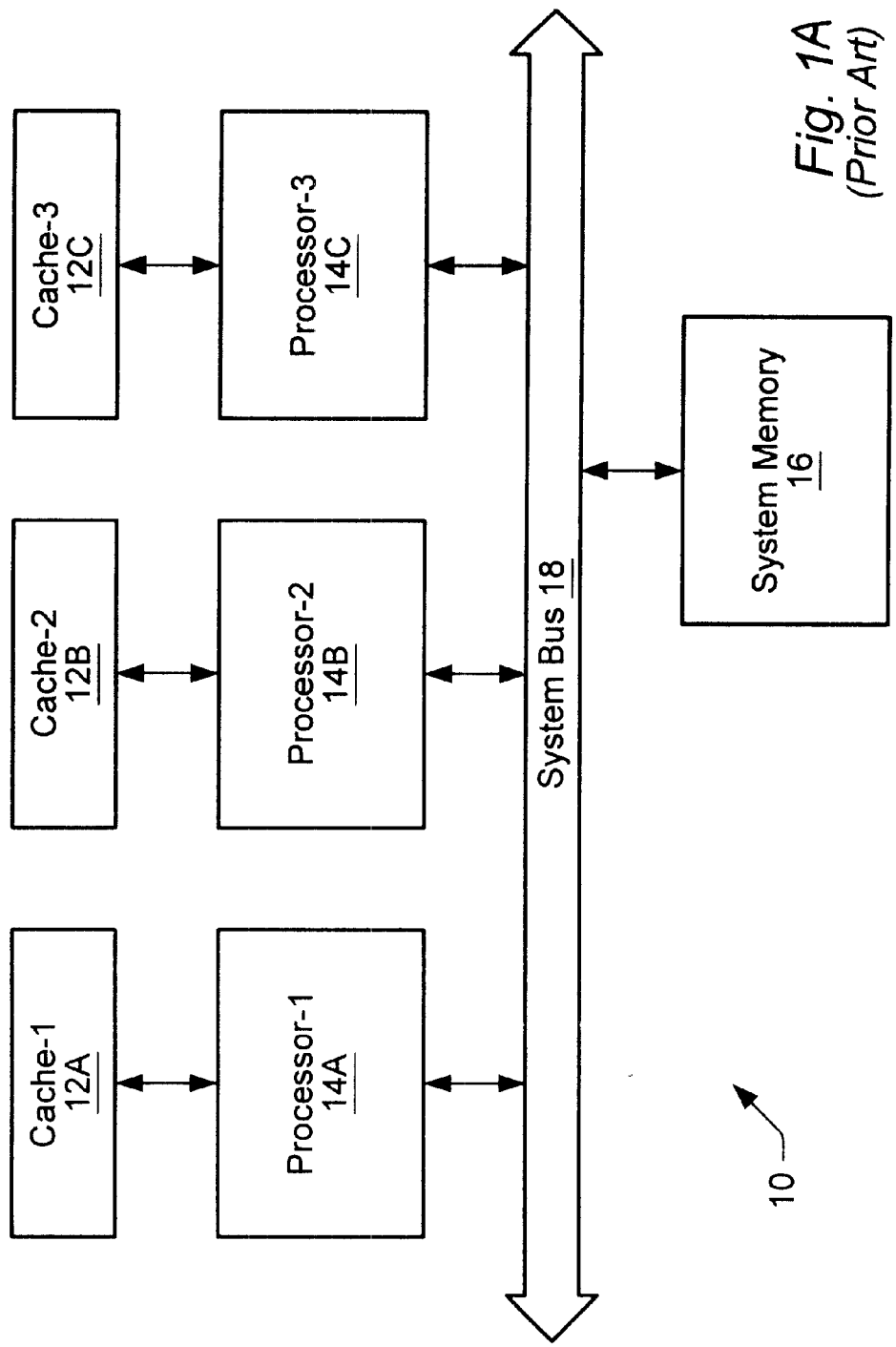
FIG. 1A shows a prior art multiprocessing computer system configuration.
Figure 1B:
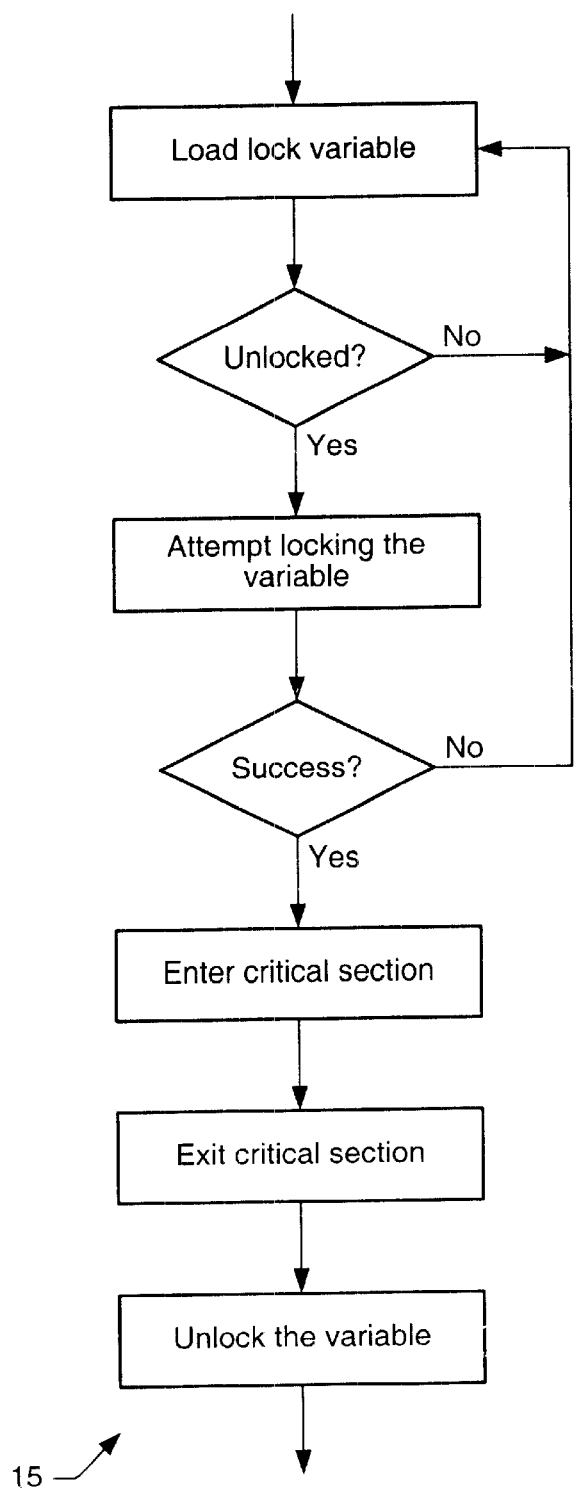
FIG. 1B is a flowchart depiction of a prior art method to perform lock operations within the computer system configuration of FIG. 1A.
Figure 2A:
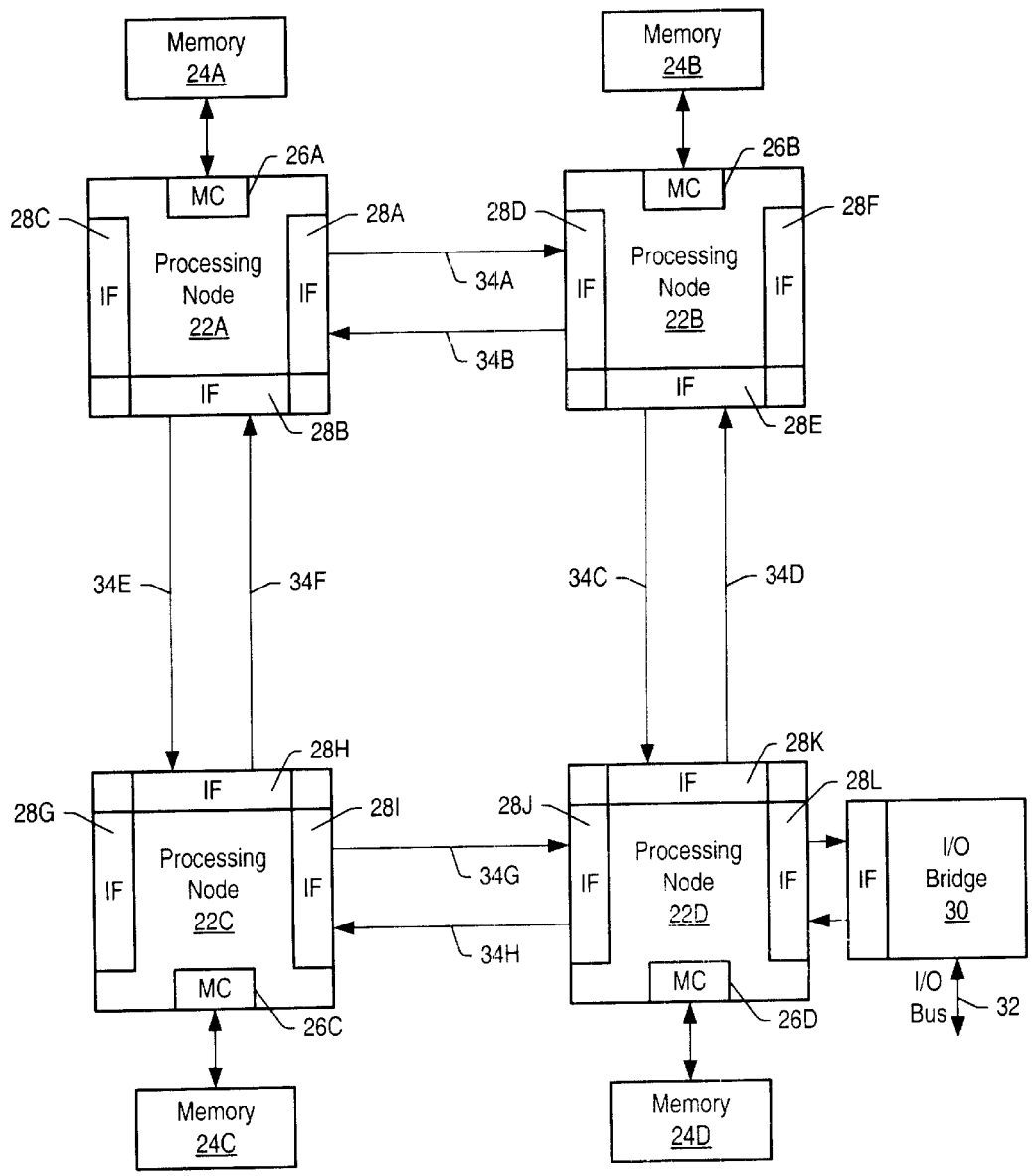
FIG. 2A is a block diagram of one embodiment of a distributed memory multiprocessing computer system.

Turning now to FIG. 2A, one embodiment of a distributed memory multiprocessing computer system 20 is shown. In the embodiment of FIG. 2A, computer system 20 includes several processing nodes 22A, 22B, 22C, and 22D. Each processing node is coupled to a respective portion of system memory 24A–24D via a memory controller 26A–26D included within each respective processing node 22A–22D. Thus, the distributed memories 24A–24D comprise the total system memory.

Additionally, processing nodes 22A–22D include one or more interface ports 28, also known as interface logic, to communicate among the processing nodes 22A–22D, and to also communicate between a processing node and a corresponding I/O bridge. For example, processing node 22A includes interface logic 28A for communicating with processing node 22B, interface logic 28B for communicating with processing node 22C, and a third interface logic 28C for communicating with yet another processing node (not shown) or an I/O bridge (not shown). Similarly, processing node 22B includes interface logic 28D, 28E, and 28F; processing node 22C includes interface logic 28G, 28H, and 28I; and processing node 22D includes interface logic 28J, 28K, and 28L. Processing node 22D is coupled to communicate with an I/O bridge 30 via interface logic 28L. Other processing nodes may communicate with other I/O bridges in a similar fashion. I/O bridge 30 is coupled to an I/O bus 32.

The interface structure that interconnects processing nodes 22A–22D includes a set of dual-unidirectional links. Each dual-unidirectional link is implemented as a pair of packet-based unidirectional links to accomplish high-speed packetized information transfer between any two processing nodes in the computer system 20. Each unidirectional link may be viewed as a pipelined, split-transaction interconnect. Each unidirectional link 34 includes a set of coherent unidirectional lines. Thus, each pair of unidirectional links may be viewed as comprising one transmission bus carrying a first plurality of binary packets and one receiver bus carrying a second plurality of binary packets. The content of a binary packet will primarily depend on the type of operation being requested and the processing node initiating the operation. One example of a dual-unidirectional link structure is links 34A and 34B. The unidirectional lines 34A are used to transmit packets from processing node 22A to processing node 22B and lines 34B are used to transmit packets from processing node 22B to processing node 22A. Other sets of lines 34C–34H are used to transmit packets between their corresponding processing nodes as illustrated in FIG. 2A.

A similar dual-unidirectional link structure may be used to interconnect a processing node and its corresponding I/O device, or a graphic device or an I/O bridge as is shown with respect to the processing node 22D. A dual-unidirectional link may be operated in a cache coherent fashion for communication between processing nodes or in a non-coherent fashion for communication between a processing node and an external I/O or graphic device or an I/O bridge. It is noted that a packet to be transmitted from one processing node to another may pass through one or more remaining nodes. For example, a packet transmitted by processing node 22A to processing node 22D may pass through either processing node 22B or processing node 22C in the arrangement of FIG. 2A. Any suitable routing algorithm may be used. Other embodiments of computer system 20 may include more or fewer processing nodes than those shown in FIG. 2A.

Processing nodes 22A–22D, in addition to a memory controller and interface logic, may include other circuit elements such as one or more processor cores, a cache memory (internal or external), a bus bridge, a graphics logic, a bus controller, a peripheral device controller, etc. Broadly speaking, a processing node comprises at least one processor and may optionally include a memory controller for communicating with a memory and other logic as desired. Further, each circuit element in a processing node may be coupled to one or more interface ports depending on the functionality being performed by the processing node. For example, some circuit elements may only couple to the interface logic that connects an I/O bridge to the processing node, some other circuit elements may only couple to the interface logic that connects two processing nodes, etc. Other combinations may be easily implemented as desired.

Memories 24A–24D may comprise any suitable memory devices. For example, a memory 24A–24D may comprise one or more RAMBUS DRAMs (RDRAMs), synchronous DRAMs (SDRAMs), static RAM, etc. The memory address space of the computer system 20 is divided among memories 24A–24D. Each processing node 22A–22D may include a memory map used to determine which addresses are mapped to which memories 24A–24D, and hence to which processing node 22A–22D a memory request for a particular address should be routed. In one embodiment, the coherency point for an address within computer system 20 is the memory controller 26A–26D coupled to the memory that is storing the bytes corresponding to the address. In other words, the memory controller 26A–26D is responsible for ensuring that each memory access to the corresponding memory 24A–24D occurs in a cache coherent fashion. Memory controllers 26A–26D may comprise control circuitry for interfacing to memories 24A–24D. Additionally, memory controllers 26A–26D may include request queues for queuing memory requests.

Generally, interface logic 28A–28L may comprise a variety of buffers for receiving packets from one unidirectional link and for buffering packets to be transmitted upon another unidirectional link. Computer system 20 may employ any suitable flow control mechanism for transmitting packets. For example, in one embodiment, each transmitting interface logic 28 stores a count of the number of each type of buffers within the receiving interface logic at the other end of the link to which the transmitting interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

Figure 2B:
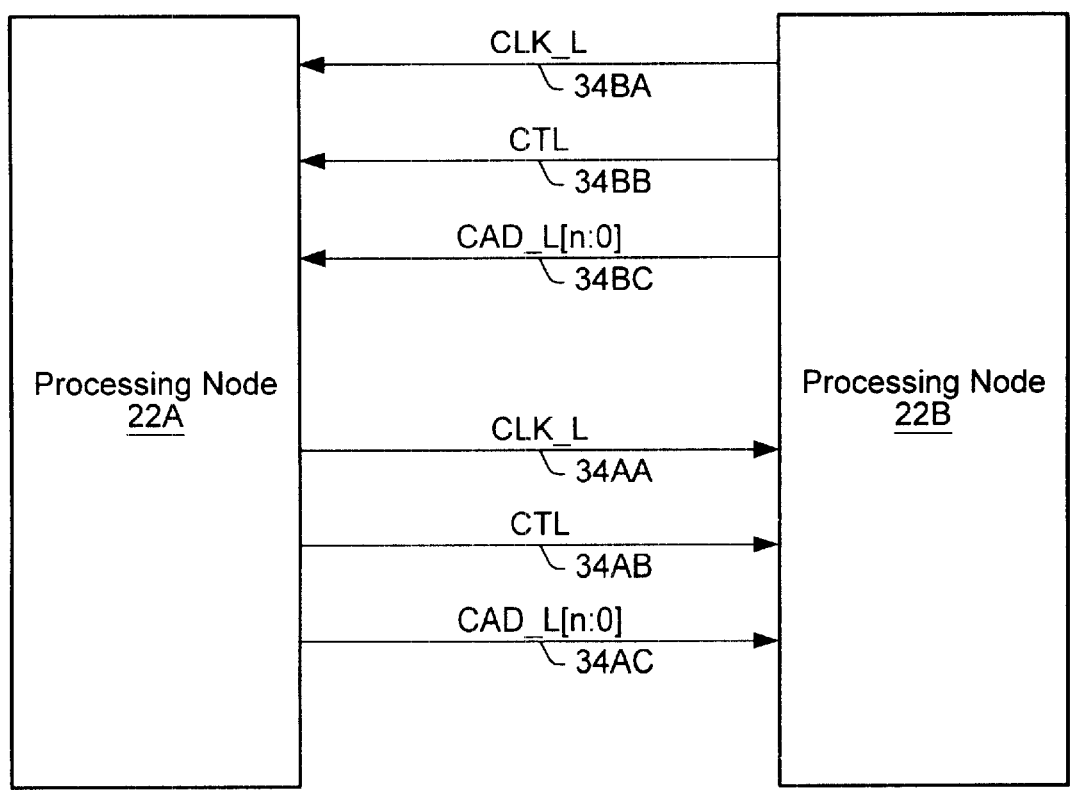
FIG. 2B shows in detail one embodiment of the interconnect between a pair of processing nodes from FIG. 2A.

Turning next to FIG. 2B, a block diagram illustrating processing nodes 22A and 22B is shown to illustrate in more detail one embodiment of the dual unidirectional link structure connecting the processing nodes 22A and 22B. In the embodiment of FIG. 2B, lines 34A (the unidirectional link 34A) include a clock line 34AA, a control line 34AB, and a command/address/data bus 34AC. Similarly, lines 34B (the unidirectional link 34B) include a clock line 34BA, a control line 34BB, and a command/address/data bus 34BC.

A clock line transmits a clock signal that indicates a sample point for its corresponding control line and the command/address/data bus. In one particular embodiment, data/control bits are transmitted on each edge (i.e. rising edge and falling edge) of the clock signal. Accordingly, two data bits per line may be transmitted per clock cycle. The amount of time employed to transmit one bit per line is referred to herein as a "bit time". The above-mentioned embodiment includes two bit times per clock cycle. A packet may be transmitted across two or more bit times. Multiple clock lines may be used depending upon the width of the command/address/data bus. For example, two clock lines may be used for a 32 bit command/address/data bus (with one half of the command/address/data bus referenced to one of the clock lines and the other half of the command/address/ data bus and the control line referenced to the other one of the clock lines).

The control line indicates whether or not the data transmitted upon the command/address/data bus is either a bit time of a control packet or a bit time of a data packet. The control line is asserted to indicate a control packet, and deasserted to indicate a data packet. Certain control packets indicate that a data packet follows. The data packet may immediately follow the corresponding control packet. In one embodiment, other control packets may interrupt the transmission of a data packet. Such an interruption may be performed by asserting the control line for a number of bit times during transmission of the data packet and transmitting the bit times of the control packet while the control line is asserted. Control packets that interrupt a data packet may not indicate that an associated data packet will be following.

The command/address/data bus comprises a set of lines for transmitting the data, command, response and address bits. In one embodiment, the command/address/data bus may comprise 8, 16, or 32 lines. Each processing node or I/O bridge may employ any one of the supported numbers of lines according to design choice. Other embodiments may support other sizes of command/address/data bus as desired.

According to one embodiment, the command/address/ data bus lines and the clock line may carry inverted data (i.e. a logical one is represented as a low voltage on the line, and a logical zero is represented as a high voltage). Alternatively, these lines may carry non-inverted data (in which a logical one is represented as a high voltage on the line, and logical zero is represented as a low voltage). A suitable positive and negative logic combination may also be implemented.

Turning now to FIGS. 3A–5, exemplary packets employed in a cache-coherent communication (i.e., the communication between processing nodes and over the coherent links 34A–34H) according to one embodiment of computer system 20 are shown. Other coherent link packets (e.g., FIGS. 8A–8C and FIG. 10C) are described later with reference to corresponding embodiments.

FIGS. 3A, 3B and 4A illustrate control packets and FIGS. 4B and 5 illustrate data packets. Other embodiments may employ different packet definitions. The control packets and the data packets may collectively be referred to as binary packets. Each packet is illustrated as a series of bit times enumerated under the "bit time" heading. The bit times of the packet are transmitted according to the bit time order listed. FIGS. 3A–5 illustrate packets for an eight-bit command/address/data bus implementation. Accordingly, eight bits (numbered seven through zero) of control or data information is transferred over the eight-bit command/ address/data bus during each bit time. Bits for which no value is provided in the figures may either be reserved for a given packet, or may be used to transmit packet-specific information. In one embodiment, each control packet consists of 4 or 8 bytes.

FIG. 3A illustrates an information packet (info packet) 38. Info packet 38 comprises four bit times on an eight bit link. The command encoding is transmitted during bit time one, and comprises six bits—denoted by the command field CMD[5:0]—in the present embodiment. An exemplary command field encoding is shown in FIG. 6. Each of the other control packets shown in FIGS. 3B and 4A includes the command encoding in the same bit positions during bit time 1. Info packet 38 may be used to transmit messages between processing nodes when the messages do not include a memory address. Additionally, the info packets may not be routed among the processing nodes, and, hence, may not require any buffering in the receiver nodes. In one embodiment, the messaging protocol may require that each info packet be accepted at its destination node. The remaining fields in the info packet 38 may be command specific as illustrated in FIG. 3A. Some exemplary info packets include a system synchronization (or sync) packet or a no operation (nop) packet as illustrated in the table in FIG. 6. In one embodiment, sync packets are used to indicate that a resynchronization event, such as a system reset or a system-wide error, has occurred in the computer system 20.

It was mentioned earlier that the messaging scheme within the multiprocessing system 20 may be considered "coupon-based" to indicate availability of buffers for control and data packets flowing between a transmitting and a receiving node. In that implementation, a transmitting node may contain a counter for each type of buffer at the receiving node. At system reset the transmitting node may clear its counters; and when the reset signal is deasserted, the receiving node may send an information packet (with a format similar to that shown in FIG. 3A, with the CMD field identifying an Nop command) to the transmitting node to indicate how many buffers of each type it has available. When the transmitting node sends a packet to the receiving node it decrements the associated counter, and when a particular counter reaches a zero value the transmitting node processor stops sending packets to the associated buffer. When the receiver frees a buffer it sends another information packet to the transmitter, and the transmitter increments the associated counter.

FIG. 3B shows an example of a command packet 40. As mentioned earlier, each unidirectional link is a pipelined, split-transaction interconnect in which transactions are tagged by the source node and responses can return to the source node out of order depending on the routing of packets at any given instance. A source node sends a command packet to initiate a transaction. The command-specific fields within the command packet 40 are described later with reference to specific commands. Generally, each command packet may include a CMD field (which has been described earlier) and an Addr field. The command packet 40 may comprise eight bit times on an eight bit link if the command packet has an associated address (e.g., during a memory read or write operation). In the absence of an associated address (e.g., during a register read or write operation), the command packet 40 may be only four bytes long.

The command encoding (i.e., the CMD field) is transmitted during bit time 1. Bit times four through eight are used to transmit a memory address—denoted by the address field Addr [39:0]—affected by the transaction, i.e., a read or a write transaction. The source node number (SrcNode) is transmitted during bit time two. The SrcNode [3:0] is a four-bit field that unambiguously identifies one of the processing nodes 22A–22D within computer system 20, and is used to route a packet through the computer system 20. In one embodiment, a maximum of 16 ($2^4$) processing nodes may simultaneously transmit, i.e., may be the sources of a command packet 40 into the system 20 because of the 4-bit long SrcNode field. Only one transaction per processing node at a given time may be allowed. In an alternative embodiment, one or more processing nodes may have more than one transaction active in the system at a given time.

FIG. 4A illustrates a response packet 42. Response packet 42 includes the command encoding (the CMD field), the destination node number (the DestNode field), and other command-specific fields described later. In contrast with the SrcNode field, the 4-bit DestNode (destination node) field identifies the processing node that is the final receiver of the response packet. Various types of response packets may include additional information. For example, a read response packet, described later with reference to FIG. 10C, may indicate the amount of read data provided in a following data packet. Generally, a response packet 42 is used for commands that do not require transmission of the address while carrying out the transaction. Furthermore, response packet 42 (e.g., the target done response packet described later with reference to FIG. 8C) may be used to transmit positive acknowledgement packet to terminate a transaction.

FIG. 4B illustrates a data packet 46. Data packet 46 includes eight bit times on an eight bit link in the embodiment of FIG. 4B. Data packets contain the data for various transactions. Generally, a data packet may follow a write command or a read response packet, and the data bytes may be transferred in an increasing address order. Data packet 46 may comprise 4 to 64 bytes. In one embodiment, length of the data packet 46 is in multiple of 4 bytes. In case of a 64-byte cache block, the data packet 46 would take 64 bit times (on an 8-bit link) to complete the cache block transfer. Other embodiments may define a cache block to be of a different size, as desired. Additionally, data may be transmitted in less than a cache block size for non-cacheable reads and writes. Data packets for transmitting data less than cache block size require fewer bit times. In one embodiment, data bytes are aligned at a doubleword (four bytes) boundary. Therefore, within a doubleword, data bytes appear in their natural byte lanes. For transfers of less than a full doubleword, the data may be padded with undefined bytes to achieve this byte lane alignment (at the doubleword boundary).

Referring now to FIG. 5, one example of a data packet 50 for a sized write command is shown. A write(sized) command transfers data for non-cacheable writes or other writes that require data less than a cache block in size. In a preferred embodiment, the size of a cache block is 64 bytes. The data packet for a sized write operation may be arranged with the lowest addressed doubleword sent first and the remainder of the addressed data sent in ascending address order in multiple of a doubleword. Thus, the data packet 50 for a sized write operation may contain anywhere from 1 to 16 doublewords (i.e., from 4 bytes to 64 bytes) in ascending address order.

In one embodiment, sized byte writes transmit 32 byte enables first, regardless of the amount of data in the data packet 50. The byte enables are denoted by the ByteEn field in FIG. 5. Each bit of a ByteEn field corresponds to a byte of data. For example, ByteEn[0] corresponds to Data [7:0], ByteEn[1] corresponds to Data[15:8], and so on. Therefore, 32 byte enables may correspond to eight doublewords (or, 32 bytes). For data lengths more than 8 doublewords but less than 16 doublewords (or, a cache block size), another data packet 50 may be transmitted with 32 byte enables, but less than 32 bytes of data. Transmission of byte enables may allow for granularity in data transmission among the processing nodes.

FIGS. 3A–5 illustrate packets for an eight-bit link. Packets for 16 and 32 bit links may be formed by concatenating consecutive bit times illustrated in FIGS. 3A–5. For example, bit time one of a packet on a 16-bit link may comprise the information transmitted during bit times one and two on the eight-bit link. Similarly, bit time one of the packet on a 32-bit link may comprise the information transmitted during bit times one through four on the eight-bit link. Formulas 1 and 2 below illustrate the formation of bit time one of a 16 bit link and bit time one of a 32 bit link in terms of bit times for an eight bit link.

$$BT1_{16}[15:0]=BT2_8[7:0] \| BT1_8[7:0] \qquad (1)$$

$$BT1_{32}[31:0]=BT4_8[7:0] \| BT3_8[7:0] \| BT2_8[7:0] \| BT1_8[7:0] \qquad (2)$$

Turning now to FIG. 6, a table 60 is shown illustrating commands employed for one exemplary embodiment of the dual-unidirectional link structure within computer system 20. Table 60 includes a command code column illustrating the command encodings (the CMD field) assigned to each command, a command column naming the command, and a packet type column indicating which of the command packets 38–50 (FIGS. 3A–5) is used for that command. A brief functional explanation for some of the commands in FIG. 6 is given below.

A read transaction is initiated using one of the Read (Sized) [also referred to as Rd(sized)], RdBlk (read block), RdBlkS (read block shared) or RdBlkMod (read block modify) commands. The sized read command, Read(Sized), is used for non-cacheable reads or reads of data other than a cache block in size. The amount of data to be read is encoded into the Rd(Sized) command packet. For reads of a cache block, the RdBlk command may be used unless: (i) a writeable copy of the cache block is desired, in which case the RdBlkMod command maybe used; or (ii) a copy of the cache block is desired but no intention to modify the block is known. The RdBlkS command may be used to make certain types of coherency schemes (e.g. directory based coherency schemes) more efficient. In response to the RdBlkS command, the target node may return the cache block to the source node in a shared state. In general, the appropriate read command is transmitted from the source node initiating a read transaction to a target node that owns the memory corresponding to the cache block requested by the source node.

The ChangeToDirty packet may be transmitted by a source node in order to obtain write permission for a cache block that is stored in the source node in a non-writeable or read-only state. A transaction initiated with a ChangeTo-Dirty command may operate similar to a read except that the target node does not return data. The ValidateBlk (validate block) command may be used t o obtain write permission to a cache block not stored in the source node if the source node intends to update the entire cache block. No data is transferred to the source node for such a transaction, but otherwise operates similar to a read transaction. Preferably, the ValidateBlk and the ChangeToDirty commands may only be directed to a memory, and may only be generated by coherent nodes. The TgtStart (target start) command may be used by a target to indicate that a transaction has been started (e.g., for ordering of subsequent transactions).

Locks

Figure 7A:
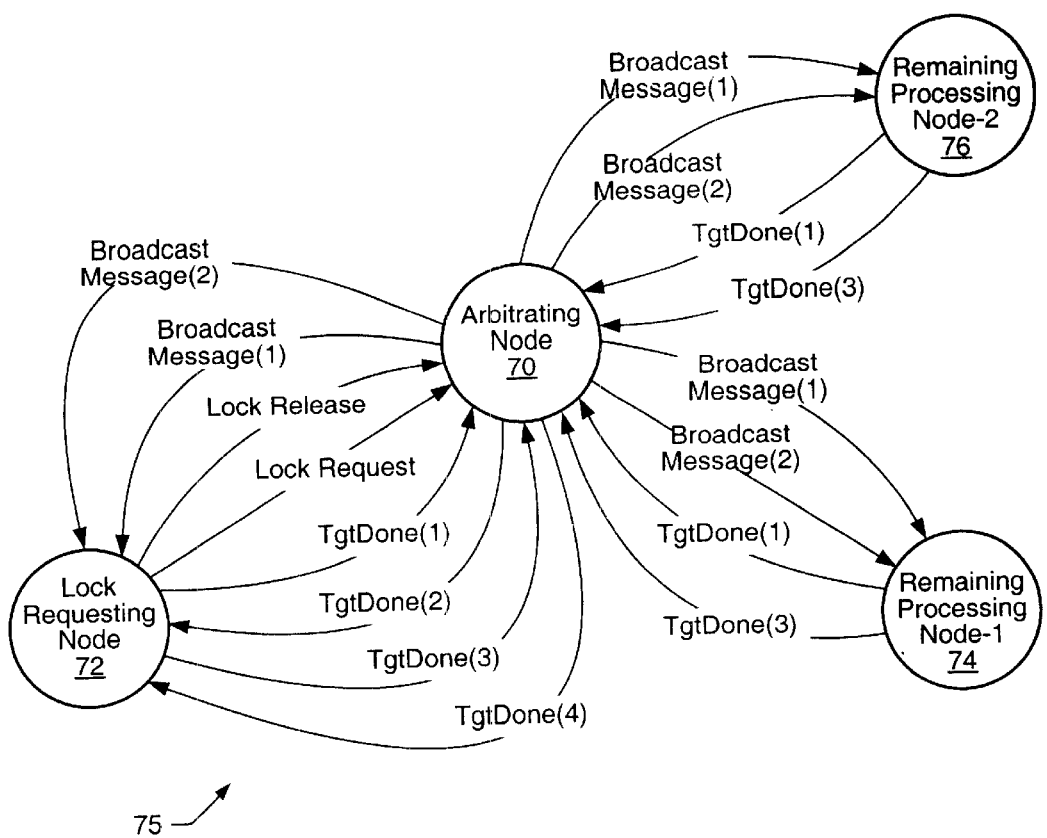
FIG. 7A is a diagram illustrating an example flow of packets during a lock transaction within the computer system of FIG. 2A.
Figure 10A:
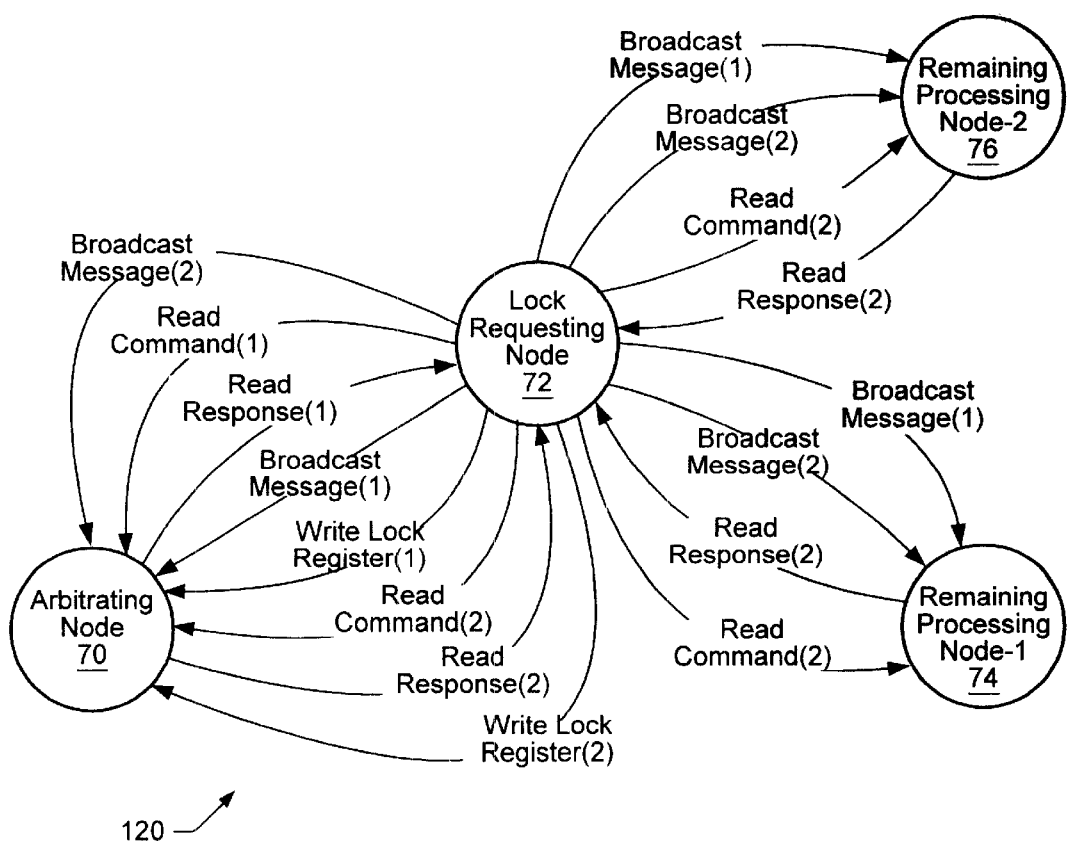
FIG. 10A is an exemplary flow of packets during a lock transaction within the computer system of FIG. 9.
Figure 12A:
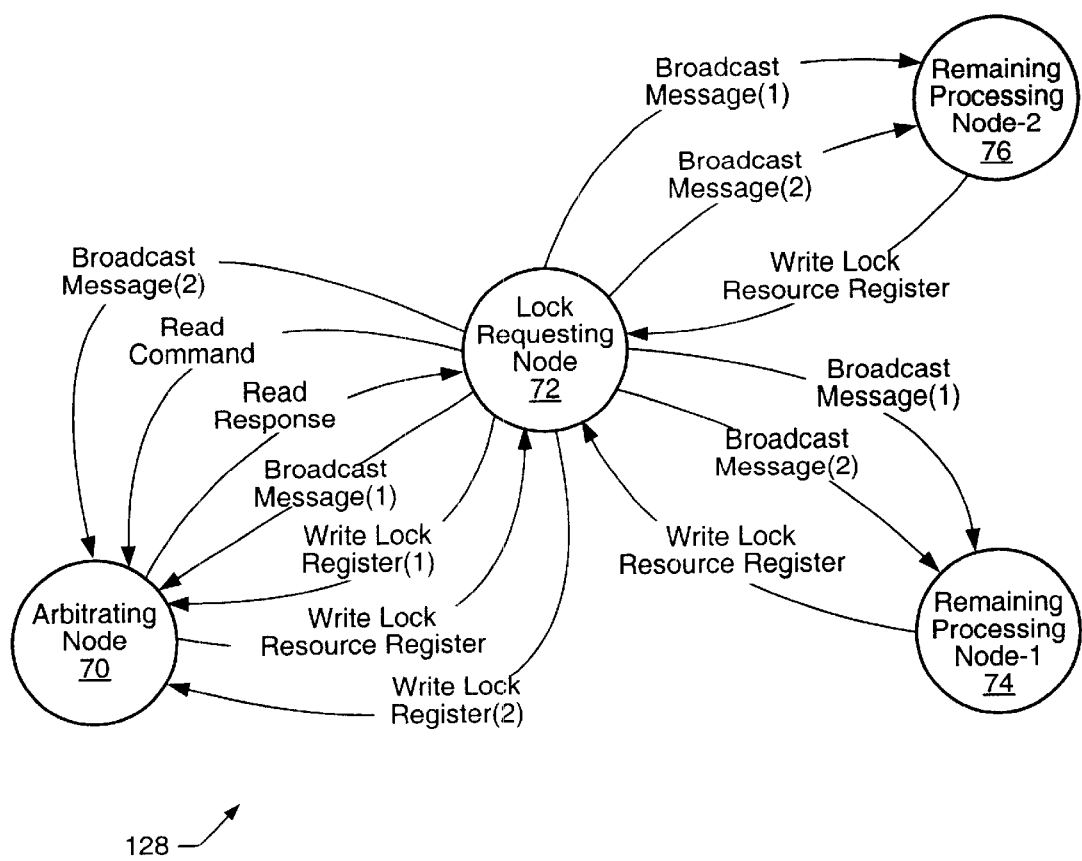
FIG. 12A illustrates an example flow of packets during a lock transaction within the computer system of FIG. 9, wherein the each processing node has the circuit elements shown in FIG. 11.

FIGS. 7A, 10A and 12A depict some example flows of packets during a lock transaction in the computer system 20. The lock requesting node is indicated by the numeral 72, the arbitrating node by the numeral 70, and the remaining processing nodes by the numerals 74 and 76. It is noted that any processing node 22A–22D may be a lock requesting node. Only one of the processing nodes may function as an arbitrating node. Here, node 22D is selected as an arbitrating node for illustration purpose only. The system designer may select any other processing node as an arbitrating node by having necessary hardware built into it. Any node that is neither an arbitrating node nor a lock requesting node is referred to as a remaining node. The same numerals are used in FIGS. 7A, 10A and 12A to identify the lock requesting node, the arbitrating node, and the remaining nodes for the sake of clarity only; it does not imply, for example, that the lock requesting node 72 in FIG. 7A is the same lock requesting node in FIG. 10A, etc. Thus, for example, node 22A may be a lock requesting node in FIG. 7A, but node 22D may be a lock requesting node in FIG. 10A. In the latter event, many of the external packets may not be needed as the arbitrating node is the same as the lock requesting node.

As mentioned earlier, any processing node in FIG. 2A may function as a lock requesting node, an arbitrating node or a remaining node depending on the particular transaction. The arrangements shown in FIGS. 7A, 10A and 12A are for illustrative purpose only, and they do not imply similar actual physical connections among the processing nodes 22A–22D. That is, the remaining node, e.g. node 76, and the lock requesting node 72 (FIG. 7A) may not be directly connected to the arbitrating node 70. Hence, additional packet routing may occur among them. Further, the arrangements of FIGS. 7A, 10A and 12A are described with reference to the circuit topology in FIG. 2A. It is understood that other interconnections between two or more processing nodes may be contemplated and the packet transfer schemes of FIGS. 7A, 10A and 12A may be easily implemented in those various interconnections. The arrows are used to indicate dependencies and represent packets that must be sent between respective nodes joined by the arrows. Generally, the outgoing arrows may not be taken until all corresponding incoming dependencies have happened. This is illustrated further below with reference to the operations depicted in FIGS. 7A, 10A and 12A.

Referring now to FIG. 7A, an example flow of packets 75 for lock acquisition and lock release operations within the multiprocessing system in FIG. 2A is illustrated. Each processing node has built-in hardware to generate appropriate packets illustrated in FIG. 7A. As mentioned earlier, any processing node may function as a lock requesting node as well as a remaining node. However, only one processing node may arbitrate lock requests within the system to provide a single serialization point for lock requests. This arrangement allows for proper synchronization of lock operations within the distributed memory architecture of FIG. 2A.

A lock transaction has three parts: lock acquisition, execution of actual lock operations, and lock release. Lock acquisition and release are serialized through a dedicated processing node (also called "the arbitrating node"). In the embodiment of FIG. 2A, the processing node 22D is assumed to have built-in hardware to function as an arbitrating node. Once the lock has been established, the lock operations may proceed just as they normally would. In other words, when a lock is established, the lock requesting node may access any of the system resources atomically. When a node 72 detects that it needs to lock the system resources, it generates a lock request message to the arbitrating node 70. In one embodiment, the lock request message may be a zero-length Write(sized) command having address in a predetermined reserved lock address range. Other embodiments may employ other lock request messages (e.g., a lock request message having a dedicated command encoding, etc.).

Each processing node within the system 20 may generate a corresponding lock request. The arbitrating node 70 may queue each received lock request in a chronological order so as to guarantee eventual service of that lock request. A FIFO (first in-first out) buffer may be provided in the arbitrating node to store pending lock requests. When a lock request is ready for service, i.e., when that lock request becomes the least recently received pending lock request (in the chronological hierarchy queue), the arbitrating node 70 transmits a broadcast packet 82 (FIG. 8B) to every other processing node in the system—including the lock requesting node 72. This is indicated by the directed arrow marked 'Broadcast Message (1)' in FIG. 7A.

The broadcast message serves to inform each recipient processing node of the decision by the arbitrating node 70 to place the corresponding lock request into service. In response to the broadcast message, each recipient processing node (excluding the lock requesting node 72) ceases issuing new requests, commands or other transactions involving shared system resources. Some examples of shared system resources include each unidirectional link 34, link buffers or interface logic 28, memory controllers 26, and/or distributed memories 24. The arbitrating processing node 70 also operates similarly in response to the broadcast message. Further, each of the remaining processing node 74, 76, and the arbitrating node 70 provide sufficient internal resources for any pending commands or responses arriving from other processing nodes within the system. This safeguard accounts for the different ways a packet may be routed within the system 20. For example, two packets from the source processing node to an identical target processing node may take different times to reach the target node.

When nodes 74 and 76 have completed the above activities, they send corresponding TgtDone (target done) responses to the arbitrating node 70. The lock requesting node 72 also sends, as part of the messaging protocol, a TgtDone message to the arbitrating node 70 in response to the broadcast message. This message transmission is illustrated by the directed arrows marked 'TgtDone (1).' The arbitrating node 70 grants lock ownership to the lock requesting node 72 after receiving all target done responses. In the preferred embodiment, the arbitrating node 70 transmits another target done response ('TgtDone (2)' in FIG. 7A) to the lock requesting node to inform the lock requesting node of its ownership of system resources, and thereby to allow it to complete lock operations atomically without causing any deadlock.

In the above messaging scheme, it may be possible that a processing node (other than the lock requesting node) transmits a lock request after the arbitrating node sends the broadcast message, but before that processing node sends its corresponding target done response. All such intermediate lock requests may be queued by the arbitrating node for later service, as discussed before. The arbitrating node 70 thus manages lock request arbitration without any resource contentions or deadlocks among the processing nodes. The present messaging scheme of granting lock ownership takes into account the distributed memory nature of the multiprocessing system 20 and the non-uniform routing of binary packets among the processing nodes.

Upon acquiring lock ownership, the lock requesting node 72 may proceed with the operation(s) which caused the node 72 to establish the lock. In one embodiment, when the locked sequence is executed, the lock requesting node transmits a lock release request to the arbitrating node to inform the arbitrating node of the completion of lock operations. In an alternative embodiment, the lock requesting node sets the appropriate semaphore for the critical region during lock acquisition process, and then releases one or more shared system resources (e.g., memory controllers) that were locked during the lock acquisition process. This allows other processing nodes to continue routine processing operations except for the processing involving the critical region. After executing locked sequence, the lock requesting node resets the semaphore so as to allow a pending lock request to be placed into service by the arbitrating node.

In one embodiment, the lock release request has the form similar to the Write(sized) packet 80 (for the lock request message) discussed later. In other embodiments, the lock release request may be implemented through other message formats (e.g., a message packet having a dedicated command encoding for the lock release request, etc.). However, contrary to the lock request packet (discussed later with reference to FIG. 8A), the Lock bit in the lock release packet is reset (binary "0"). The arbitrating node responds to the lock release request by further transmitting a broadcast message ('Broadcast Message (2)' in FIG. 7A) to each of the other processing nodes 72, 74 and 76. The Lock bit (discussed later) in the Broadcast Message (2) is reset to inform each recipient processing node of the completion of lock operations by the lock requesting node 72. In one embodiment, a messaging scheme similar to the one described earlier with reference to lock acquisition is implemented during lock release. In other words, each recipient processing node 72, 74 and 76 may respond to the Broadcast Message (2) by transmitting a corresponding target done ('TgtDone(3)' in FIG. 7A) responses to the arbitrating node 70, which, in turn, may further send a final target done response ('TgtDone(4)' in FIG. 7A) to the lock requesting node upon receiving all TgtDone(3) responses. This messaging completes the sequence of packet transmissions involved in a lock acquisition and subsequence release of the lock. After transmitting the TgtDone(4) response, the arbitrating node may start processing other pending lock request in its queue.

Figure 7B:
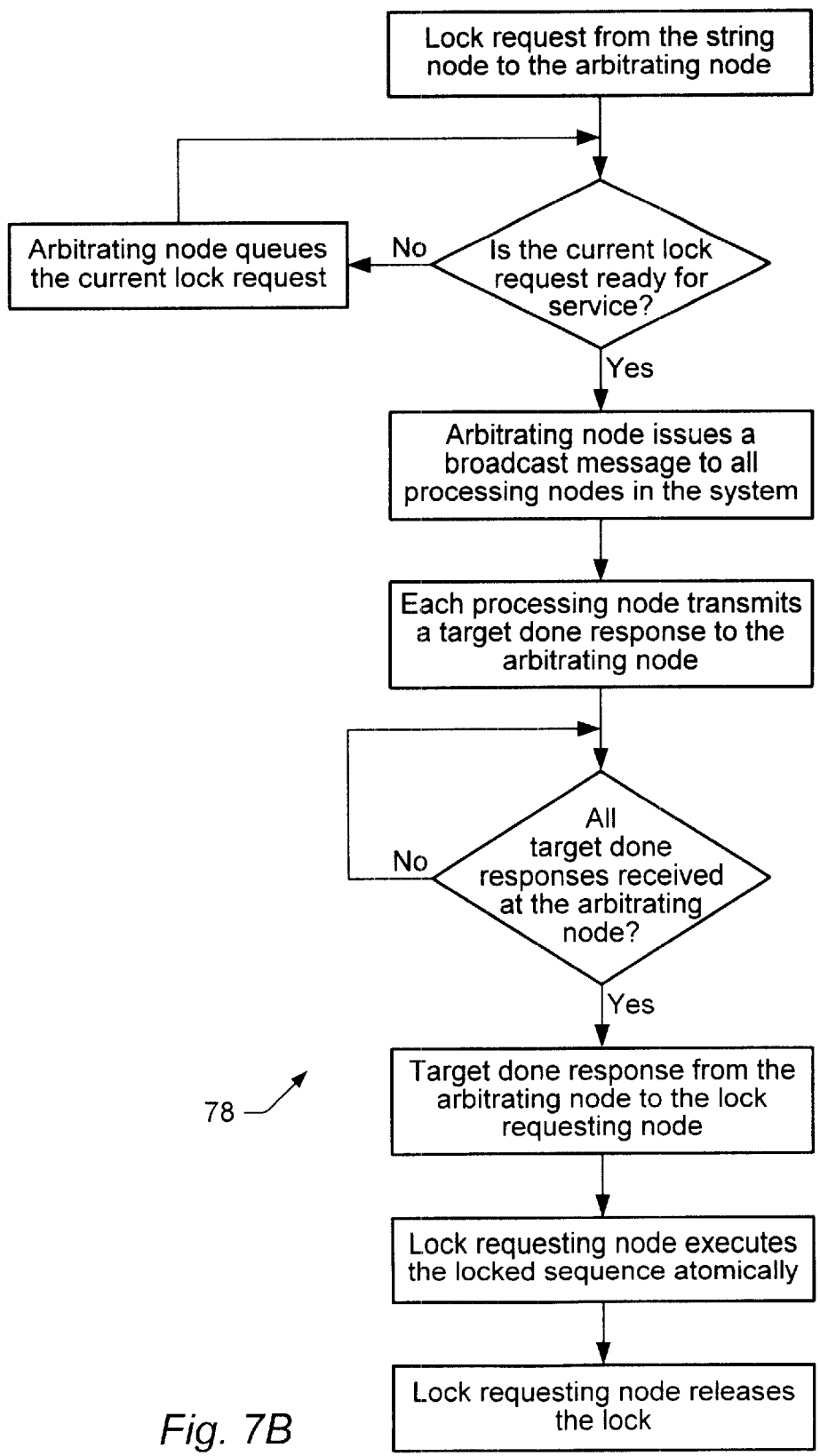
FIG. 7B is an exemplary flowchart for the diagram in FIG. 7A.

Referring now to FIG. 7B, a simplified flowchart 78 for the messaging scheme depicted in FIG. 7A is illustrated. All the operations associated with various blocks in the flow diagram of FIG. 7B have already been explained with reference to FIG. 7A. Lock release operation is not illustrated in detail because it is self-explanatory in view of the earlier discussion.

Figure 8A:
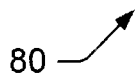
FIG. 8A is a block diagram of a sized write command packet.

One embodiment of a Write(sized) packet 80 is shown in FIG. 8A. The SrcNode field is set to the node number of the lock requesting node 72. As discussed earlier, each processing node within the system 20 has a unique identification number. The node identification number may be permanently stored within each processing node upon fabrication, or may be assigned by the system software upon start-up. Each processing node may also have mapping tables containing node numbers for each remaining processing node within the system so as to facilitate packet generation and routing to appropriate destinations. The DestNode [3:0] field carries the node number of the processing node to which the Write(sized) packet should be routed. In the present case, the DestNode field will contain the node number of the arbitrating node 70. In the preferred embodiment, the arbitrating node 70 is node zero (i.e., the processing node having node identification number "0"). The destination node is the final receiver of a packet that may be routed through one or more intermediate processing nodes. Each source node (i.e., the lock requesting node 72) contains address-mapping tables and places the node number for the arbitrating node 70 into the Write (sized) packet 80.

Additionally, the source of the packet (here, the lock requesting node 72) may assign a source tag (SrcTag) transmitted during bit time 3. The source tag identifies packets corresponding to a particular transaction initiated by the source node (i.e., each packet corresponding to a particular transaction includes the same source tag). Thus, for example, when the SrcTag field is of 7-bit length, the corresponding source node can have up to 128 ($2^7$) different transactions in progress in the system. Responses from other nodes in the system will be associated to corresponding transactions through the SrcNode and SrcTag fields in the responses.

The sized write command may transfer data in bytes or doublewords. The data packet for a sized write command may be similar to the data packet 50 in FIG. 5. The Write(sized) packet may contain the starting doubleword address of the data (the Addr field) and a set of data elements (bytes or doublewords) to be transferred. Bit 3 in the CMD field, i.e., CMD[2], indicates whether the data elements to be transferred are bytes or doublewords. In one embodiment, a value of binary "1" in the CMD[2] bit denotes transmission of a doubleword, whereas a value of binary "0" in the CMD[2] bit denotes transmission of a byte.

Another feature of the Write (sized) packet 80 is the presence of the Count field. As mentioned earlier, the Write(sized) packet from the lock requesting node 72 indicates a zero-length data packet. Thus, in a non-cacheable write operation, the size of data may be less than the size of a cache block. This type of sized write operation is facilitated with the help of the Count field. The length of the Count field, in the present example, is shown to be four bits. The Count field encodes the number of byte or doubleword data elements that should be transferred following the Write command. Byte writes may transfer any combination of bytes within a half-line (i.e., 32 bytes when the cache line is size is 64 bytes) so long as the half-line falls within a single aligned cache line. Byte transfers that cross a cache line boundary may be broken into multiple transactions, issued in ascending address order. For example, one byte at the end of a first cache line and a second byte from the beginning of a second cache line may require two separate data packets 50.

As previously mentioned, the data packet 50 for a sized byte write operation contains byte enable information in the first doubleword of the data packet 50. The Count field may be used to indicate the total size (in doublewords) of the data packet 50. This size may also include the doubleword that contains byte enables. Therefore, the range of doublewords indicated by the Count field is from 2 (one doubleword of data plus one doubleword of byte enables) to 9 (one doubleword of byte enables plus eight doublewords of data). This is accommodated by the four-bit long Count field with binary 0001 representing two doublewords and binary 1000 representing nine doublewords. The Count field specifies the length of the data packet 50 independent of the value of the byte enables. In some cases, the byte enables may be zero for corresponding doublewords that are sent through the data packet 50. Alternately, some byte enables may be non-zero, but the corresponding doublewords are not sent. In the preferred embodiment, the Write (sized) command from the lock requesting node 72 has the entire byte enable doubleword with zero value. In such an event, the system performs all activities usually associated with the Write command 80; however, no data is written into the destination node (i.e., the arbitrating node 70). Additionally, the Count field may contain binary 0000 to indicate absence of any data bytes (i.e., only one byte enable doubleword and no data doublewords) in the data packet 50.

Further, the Write(sized) packet 80 from the lock requesting node 72 contains a Lock bit (Addr[2]) that is set to indicate a new lock request. The Lock bit is clear to indicate a lock release transaction. Throughout the discussion, the term "set" indicates the binary "1" value, whereas the term "reset" indicates the binary "0" value. However, the opposite convention (i.e., "0" for "set" and "1" for "reset") may be chosen to implement the same functionality. In the preferred embodiment, the reserved lock address range comprises eight addresses (as discussed later with reference to FIG. 8B). In that case, the arbitrating node 70 may be configured to recognize the Write(sized) packet as a lock request based on the content of the Addr field. The CMD field may still indicate that the packet 80 is a Write(sized) packet, but the Addr field may uniquely identify the packet 80 as a lock request, and not a memory Write operation. The Addr field in the lock request packet 80 may not be associated with any physical memory locations for data storage or retrieval.

FIG. 8B illustrates one embodiment of a broadcast packet, and FIG. 8C shows a block diagram for a target done packet. An example of CMD field encodings for these packets is given in FIG. 6. Referring first to the broadcast packet 82, the SrcNode field carries the node number of the lock requesting node, i.e., the SrcNodes field in the broadcast packet 82 and in the Write(sized) packet 80 from the lock requesting node carry the same information. Broadcast messages are used to communicate information to all processing nodes within the system.

In one embodiment, a broadcast message is both accepted and forwarded by each recipient processing node so as to cover all processing nodes within the system. Each processing node may contain a routing table for use with broadcast packets. The routing table has one entry for each of the 16 source nodes (as denoted by a 4-bit SrcNode field) within the system. This indicates originators of corresponding broadcast packets. Each entry in the routing table is a 15-bit vector. Each bit in the 15-bit vector identifies one of up to 15 interface ports 28 (FIG. 2A) in the present node, and indicates whether or not the broadcast packet is forwarded through the corresponding interface port.

Features that are implemented using a broadcast message have a reserved address range (from the memory address space) associated with them. This reserved address range and associated features are recognized by all message recipients. Thus, even though the CMD field is the same for all types of broadcast messages, the Addr field conveys information to distinguish one broadcast packet (performing one type of operation) from another broadcast packet (performing a different type of operation). The reserved address range associated with the broadcast messages may be identified by the Addr field. In the embodiment of FIG. 8B, the first three bits of the Addr field (Addr[2:0]) are absent. Therefore, a total of eight addresses comprise the reserved address space for a lock transaction within the system 20. Four of the reserved addresses may be associated with broadcast packets generated in response to a lock request. These broadcast packets will correspond to the Write(sized) packet 80 (the lock request packet) with Addr [2] bit (the Lock bit) set. Similarly, four of the reserved addresses may be associated with broadcast packets generated in response to a lock release request. These broadcast packets, however, will correspond to the Write(sized) packet 80 (the lock release request packet) with Addr[2] bit (the Lock bit) reset. In the preferred embodiment, the broadcast messages receive a target done response from each recipient processing node as illustrated in FIG. 7A.

The arbitrating node 70 may be configured to generate appropriate broadcast message in response to the lock request or the lock release request. In one embodiment, the SrcTag field in the broadcast packet 82 may be identical to that in the Write(sized) packet 80 for a lock request or a lock release request, whatever the case may be. The TgtNode (target node) field in the broadcast message carries the node identification data (or, the node number) for the arbitrating node 70. This TgtNode field data from the broadcast packet 82 may be placed into the DestNode field in the target done packet 84.

Referring now to FIG. 8C, a block diagram of a target done response packet is shown. The SrcNode field carries the node number of the source of the target done message, i.e., the processing nodes 72, 74 and 76. The DestNode field carries the node number of the destination node for the target done packet 84, i.e., the arbitrating node 70. In one embodiment, the SrcTag field is identical to the SrcTag field in the corresponding broadcast message packet, which, in turn, is identical to the SrcTag field in the corresponding lock request or the lock release request from the node 72. Thus, the SrcTag maintains the identification of the transaction being carried out among various processing nodes. A target done message signals that the associated transaction has completed at the target, i.e., the node sending the target done response. The Error bit in the target done message is used to indicate an error at the target, e.g., during processing of one or more transactions giving rise to the target done message. The Error bit is set to indicate this error condition to the node destination node (DestNode field) of the TgtDone message. The error bit is normally set in those conditions where the error is detected prior to sending the target done message. A later arising error condition may not get reported.

The TgtDone response contains a Tgt (target) bit to indicate whom the target done response is destined for. The Tgt bit, when set, may indicate that the TgtDone response is for the memory controller (not shown) in the destination node, i.e., the arbitrating node 70. In one embodiment, the Tgt bit, when reset, may indicate that the TgtDone response is destined for the source of the entire transaction. The Tgt bit, thus, may identify how the packet flow is managed internally within a processing node. The Tgt bit may be omitted in an alternative embodiment of the TgtDone response packet.

Figure 9:
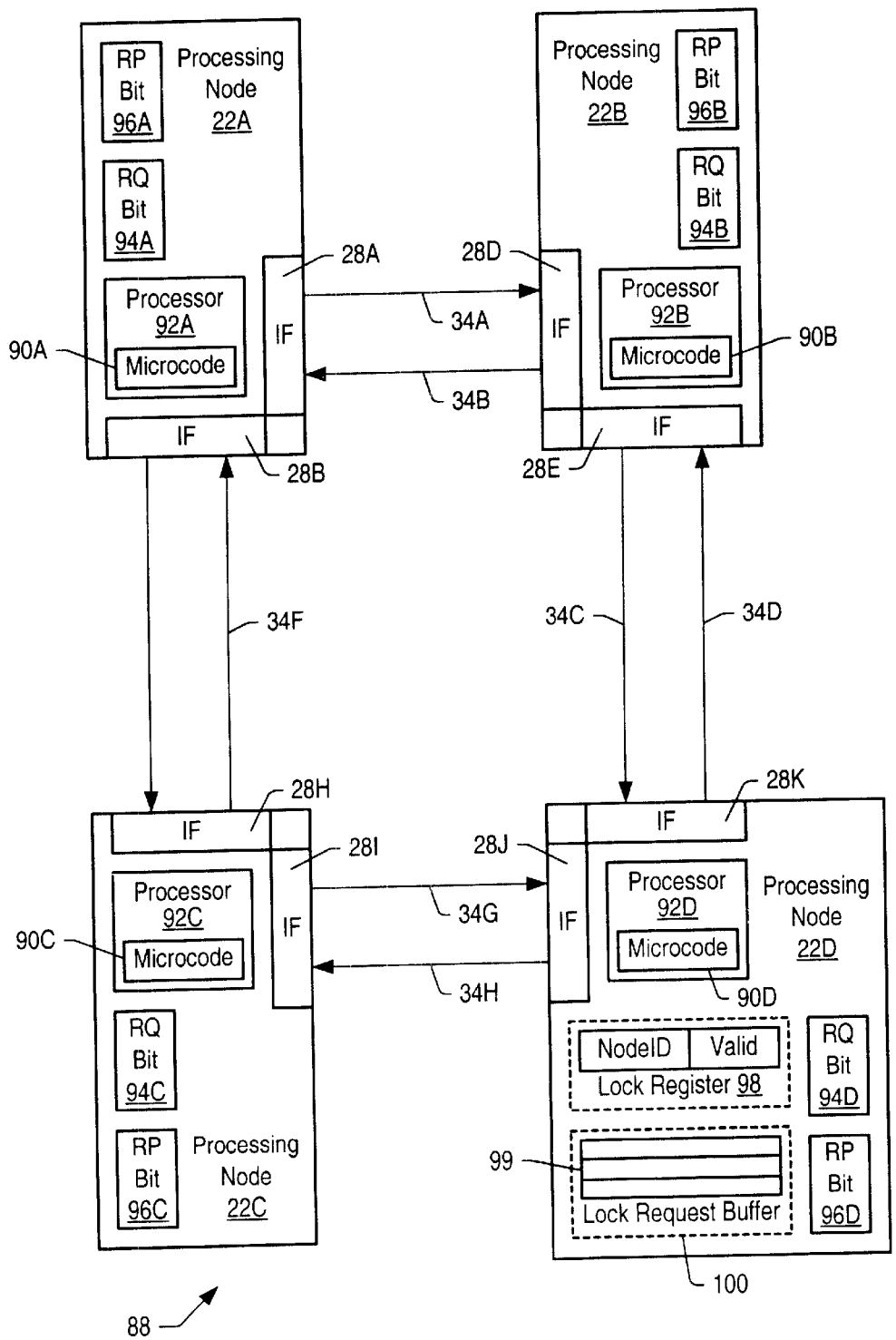
FIG. 9 illustrates a block diagram of another embodiment of the distributed memory multiprocessing computer system in FIG. 2A. Processing node architectures for implementation of locks in microcode are also illustrated.

Referring now to FIG. 9, an alternative embodiment of the multiprocessing system 20 in FIG. 2A is shown. Some of the details, e.g., memory connections, have been omitted for the sake of clarity. The dual-unidirectional link interconnect structure in the multiprocessing system 88 may be similar to that in the system 20. The distributed memory multiprocessing system 88 includes microcode routines within each node in the system 88. The microcode 90 may be stored in a processor's 92 internal memory within each corresponding processing node 22. Thus, the processors 92A–92D within the nodes 22A–22D may contain identical microcodes 90A–90D to manage lock transactions. As described later with reference to FIG. 10A, the presence of microcode in each processing node may allow for less hardware within the lock arbitrating node (here, the node 22D), and may also reduce transactions originating from the lock arbitrating node. Each processing node is given responsibility to establish and release locks. However, the arbitrating node (e.g., node 22D) is used to properly sequence a plurality of lock requests within the system and thereby to synchronize lock operations without resource conflicts or deadlocks.

In the embodiment in FIG. 9, the arbitrating node includes a lock register 98 and a lock request buffer 100. The lock register 98 may contain two fields: (1) the NodeID field, and (2) the Valid bit field. The NodeID field contains node identification data for one of the processing nodes that had or that is acquiring lock ownership. The node identification data, in one embodiment, is simply the node number of a processing node. The Valid bit functions to indicate whether the NodeID field contains valid node identification data, i.e., whether the node identification data in the NodeID field is of a processing node who may establish the current ownership of the lock (when the valid bit is set). The lock request buffer 100 is provided to store node identification data for all other processing nodes who have pending lock requests. In case of four processing nodes, the lock request buffer 100 may contain the storage space 99 to store node identification data for three of the processing nodes within the system 88, because at any given time only one of the processing node may have its NodeID in the lock register 98. In other words, only one processing node may be the owner of the lock at any given time. All the other processing nodes may still send their NodeID's to the arbitrating node, however these NodeID's will not be placed into the lock register 98 until the previous processing node releases the lock (as indicated by a reset valid bit).

In an alternative embodiment, the lock request buffer 100 may be absent. In that case, once a processing node releases the lock, each other lock requesting processing node may attempt to place its NodeID within the lock register 98. Due to different routing paths and varying routing times, it may happen that one or more of the processing nodes may have to wait an indeterminate number of times before acquiring lock ownership. To prevent the race for the lock register, it may therefore be desirable to have the lock request buffer 100 to accomplish a fair allocation of lock ownership among the plurality of lock requesting nodes.

Figure 10B:
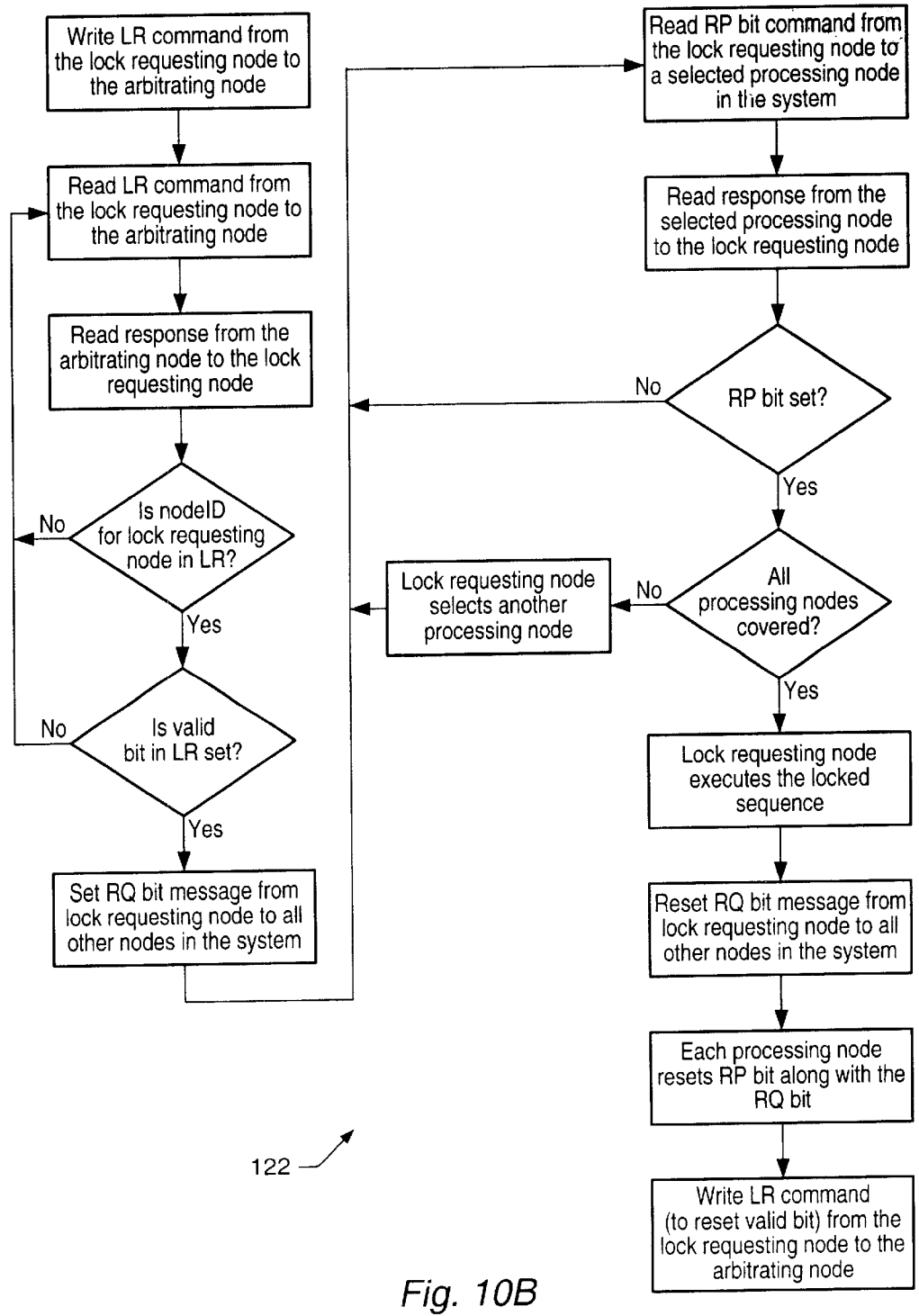
FIG. 10B is an exemplary flowchart for the diagram in FIG. 10A.

Each processing node 22 within the system 88 also includes a release request bit (RQ bit) 94 and a release response bit (RP bit) 96. The release request bits 94A–94D and the release response bits 96A–96D may be part of the corresponding processor core 92A–92D, or they may be part of a register within the corresponding processing node. The use of these bits is discussed below with reference to FIGS. 10A and 10B.

Referring now to FIG. 10A, an exemplary flow of packets 120 during lock acquisition and release within the processing system 88 is shown. The microcode in the lock requesting node 72 first transmits a write lock register command ('Write Lock Register(1)' in FIG. 10A) to the arbitrating processing node 72. The write lock register command may be similar to the Write(sized) command 80 (FIG. 8A) used to transmit a lock request in FIG. 7A, except that the Addr field may identify the lock register 98. The data packet may be the node number of the lock requesting node 72. In an alternate embodiment, no data may be transmitted after the write command. The arbitrating node 70 may identify the transaction associated with the write command as a lock transaction sent to the reserved address space (as indicated by the Addr field). Upon receiving the write command, the arbitrating node 70 may extract the pertinent NodeID information from the processing node number contained in the SrcNode field within the write command.

Based on the status of pending lock requests, the arbitrating node 70 may either place the NodeID (of the lock requesting node 72) into the lock register 98 or may, instead, queue the received NodeID in the lock request buffer 100 in a chronological order. In other words, the lock request buffer 100 may be a FIFO buffer. In one embodiment of the present messaging scheme, the arbitrating node 70 may transmit a target done message (not shown in FIG. 10A) to the lock requesting node 72 in response to the Write Lock Register(1) message.

Figures 10C, 11:
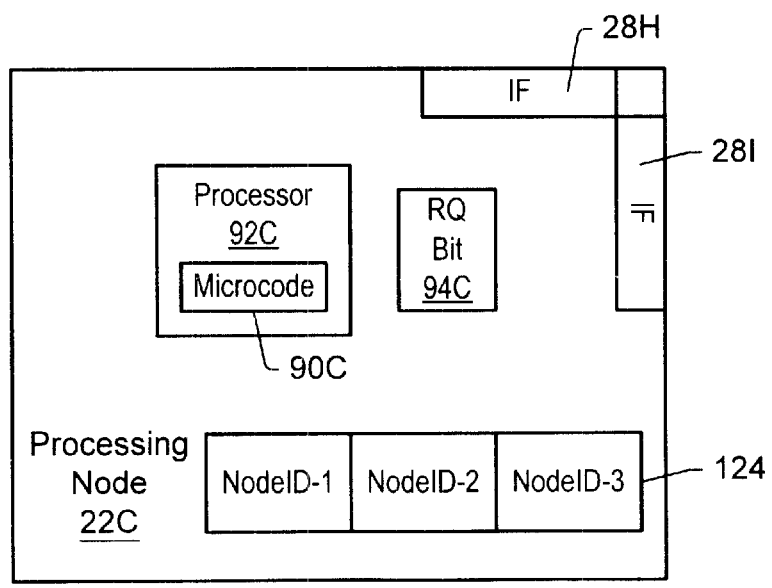
FIG. 10C is a block diagram of one embodiment of a read response packet.
FIG. 11 is a block diagram of one embodiment of a processing node within the computer system of FIG. 9.

After sending the write lock register message, the lock requesting node 72 iteratively reads the content of the lock register 98 until it finds its node identification information in the lock register 98 with the valid bit set. The lock requesting accomplishes this by transmitting a read command ('Read Command (1) in FIG. 10A) periodically to the arbitrating node 70, which, in turn, transmits a corresponding read response packet ('Read Response (1)' in FIG. 7A) to the lock requesting node 72. The data packet corresponding to the read response packet has the current contents of the lock register 98. This command and response sequence is continued until the read response data packet from the arbitrating node 70 contains the NodeID data for the lock requesting node with the valid bit set. The microcode in the lock requesting node is configured to execute these iterations (as illustrated in the flow chart in FIG. 10B) until the desired conditions are met. A block diagram of an exemplary read response packet is shown in FIG. 10C and explained later with reference thereto.

It is noted that a different processing node may establish lock ownership during the iterative reading process commenced by the lock requesting node 72. In that case, the lock requesting node may cease initiating new transactions as described above. The lock requesting node 72 may, however, continue its reading of lock register after the lock owner node releases the lock.

Upon finding its node identification data valid, the lock requesting node 72 transmits a broadcast message ('Broadcast Message (1)' in FIG. 10A) to each processing node (including the arbitrating node 70) to set the corresponding release request bits. In the broadcast message (e.g., the message packet shown in FIG. 8B), the SrcNode and the TgtNode field may contain the same data, i.e., the node number of the lock requesting node 72. The broadcast message may instruct the recipient processing node to set the corresponding release request bit. The release request bit, when set, may further inform the respective processing node of the claim of lock ownership by the lock requesting node 72. This means that the recipient processing node may have to start internal operations to release the shared system resources to the lock requesting node 72. Further, in one embodiment of the present messaging scheme, each recipient processing node 70, 74 and 76, may transmit a target done message (not shown in FIG. 10A) to the lock requesting node 72 upon setting the corresponding RQ bit in response to the Broadcast Message(1) from the lock requesting node 72.

In an alternative embodiment, the microcode within the lock requesting node 72 may transmit an individual write command (e.g., a packet similar to the Write(sized) packet 80 in FIG. 8A) to each processing node 70, 74 and 76 to set the corresponding release request bit. In other words, the microcode within the lock requesting node 72 may initiate the setting of release request bits, one at a time.

After setting the RQ bit in response to the Broadcast Message(1) (or, the individual write command), each recipient processing node initiates internal operations to guarantee sufficient resources for any pending message packets to be received from other processing nodes within the system 88, and to cease issuing new requests within the system. Once a recipient processing node has completed the above, the microcode within that node may set the corresponding release response (RP) bit. In one embodiment, the RP bit is set after setting the RQ bit. In an alternate embodiment, a processing node provides sufficient resources as described above and hence sets its RP bit simultaneously with the RQ bit if the above operations are already over.

After receiving the target done message informing it of setting of the RQ bit, the lock requesting node 72 sequentially and iteratively reads the content of RP bits within the remaining processing nodes 70, 74 and 76. In other words, the microcode within the lock requesting node 72 may select a processing node (e.g., node 76) and transmit a read command to read the RP bit within that node. The processing node (here, node 76) receiving the read command may transmit a read response packet (described later) indicating status of the RP bit therein.

When a read response packet indicates that the corresponding RP bit is set, the microcode within the lock requesting node 72 may select another processing node to similarly read status of the respective RP bit. The microcode again iteratively reads the content of the new RP bit until it is set. This process continues until each processing node 70, 74 and 76 has its RP bit set. This messaging sequence is indicated by the Read Command(2) and Read Response(2) messages in the flow diagram of FIG. 10A.

Upon acquiring the lock, the requesting node 72 proceeds with executing lock operations. After completing the lock operations, the lock requesting node 72 (through its microcode) transmits a broadcast message ('Broadcast Message(2)' in FIG. 10A) instructing each remaining processing node 70, 74 and 76 to reset the corresponding RQ bit. In one embodiment, the Broadcast Message(2) is transmitted after reception of the target done response from the arbitrating node 70 as discussed in the preceding paragraph. Typically, the Broadcast Message(2) may be sent after transmitting the Write Lock Register(2) command. The microcode within each recipient processing node 70, 74 and 76 may reset the RQ bit upon decoding the broadcast message. In an alternate embodiment, the microcode within the lock requesting node 72 may send individual write commands (to one processing node at a time) to each processing node 70, 74 and 76 to instruct the recipient processing node to reset the corresponding RQ bit, as described earlier with reference to setting the RQ bit.

In one embodiment, each recipient processing node 70, 74 and 76 may also internally reset the RP bit along with the RQ bit and then transmit a target done response (not shown in FIG. 10A) to the lock requesting node 72. Alternately, the RP bit may be reset after resetting the RQ bit and after transmitting the target done response. Other arrangements may be devised. The RQ bit, when reset, informs the corresponding processing node of the completion of associated lock operations and the release of the locked system resources by the lock requesting node 72. Each recipient processing node 70, 74 and 76 may resume normal processing operations (including lock acquisition) upon receiving the reset RQ bit message (through the Broadcast Message(2) or through the individual write command), or anytime thereafter.

Subsequently, the requesting node 72 transmits a write command ('Write Lock Register (2)' in FIG. 10A) to the arbitrating node 70 to reset the valid bit in the lock register 98. This allows the arbitrating node to place a pending lock request into service. In one embodiment of the present messaging scheme, the arbitrating node 70 may transmit a target done response (not shown in FIG. 10A) to the lock requesting node 72 upon resetting the valid bit in response to the write lock register command. The foregoing description of one embodiment of a microcode-based lock transactions within the system 88 is illustrated in the flowchart 122 in FIG. 10B. It is noted that the foregoing messaging scheme may facilitate conflict-free lock acquisition and lock release transactions within the system 88. For example, resetting the valid bit after resetting individual RQ (and RP) bits may prevent out-of-order arrivals at a processing node of a reset RQ bit message (from the current lock requesting node) and a set RQ bit message (from the next lock requesting node in line).

Referring now to FIG. 10C, an exemplary encoding for a read response packet 123 is shown. The SrcNode field contains the node number of the node transmitting the read response 123, and the DestNode field identifies the node receiving the read response (i.e., the lock requesting node 72 in FIG. 10A). The command field (CMD field) and the SrcTag field have already been previously described. In one embodiment, the read commands from the lock requesting node 72 (FIG. 10A) may be Read(sized) commands because of the reading of sized data, i.e., less than a cache block in size. In one embodiment, the Addr[2] bit may not be defined as a Lock bit in the Read(sized) command packet, which may otherwise be similar to the Write(sized) packet 80. This Read(sized) packet may indicate, through the Count field, the number of bytes or doublewords to be transferred through the corresponding read response.

A typical data packet that may follow a read response packet 123 may be similar to the data packet 50 in FIG. 5. The content of the lock register 98 or of the RP bit may typically be less than a byte in size. Each data packet that follows a read response packet 123 may include a double word (data bits; Count=0001) similar to an earlier discussion with reference to FIG. 5. Any additional bytes in the first doubleword transmitted through the data packet 50 may be padded with undefined data to achieve byte lane alignment. Arrangements to transmit the contents of the lock register 98 and the RP bit without using a data packet (such as the one in FIG. 5) may also be devised.

The Count field in the read response packet 123 may function similarly to that in the Write(sized) [or, Read (sized)] packet 80 in FIG. 8A. In one embodiment, the Count field in the read response packet 123 is an exact replica of that in the corresponding Read(sized) packet. In an alternative embodiment, however, the Count field in the read response packet 123 may indicate a count that is one less than what is conveyed by the Count field in the Read(sized) packet. For example, in the event of only one byte of data transfer, the Count field in the Read(sized) packet may contain binary values 0001. However, the count field in the read response packet 123 may be binary 0000. Generally speaking, the Count field may indicate the size of the data to be transmitted following the read response packet 123.

The error bit (when set) in the read response packet 123 may indicate occurrence of an error during the requested read operation. The error may arise, for example, when the address contained in the Addr field in the Read(sized) command is non-existent, or, during a memory read operation, a parity error is detected in the accessed system memory or cache. In one embodiment, the requested data is generally sent to the lock requesting node 72 even when an error condition is detected. The error bit, however, will be set to indicate such error condition to the data recipient node, i.e., the lock requesting node 72. The probe bit may be clear (binary "0") to indicate that the read response 123 is sent in response to a read command, and not in response to a memory probe command requiring maintenance of cache coherency. The Shared bit may be set when the requested data is shared between two or more nodes. In case of the lock transaction depicted in FIG. 10A, the Shared bit may be clear or reset to indicate absence of any sharing of the data being read. The target bit (Tgt bit) is similar to that described with reference to the target done response in FIG. 8C. The Tgt bit may be clear to indicate that the read response packet 123 is destined for the source of the read transaction, i.e., the lock requesting node 72.

Referring now to FIG. 11, an alternative embodiment for one of the processing nodes 22C in the multiprocessing system 88 is shown. The RP bit 96 in FIG. 9 is replaced by a lock resource register (LRR) 124. The processing node 22C is shown for illustrative purpose only. Typically, each processing node 22A–22D may have one lock resource register fabricated therein. The lock resource register may be part of a processor core within the corresponding node, or may be part of any external logic or control elements. The size of the LRR may depend on the size of the node identification data (NodeID) for a processing node. The total number of NodeIDs in the lock resource register would be one less than the total number of processing nodes within the system. For example, in a system with four processing nodes (e.g., system 88 in FIG. 9), the lock resource register would contain space to store three NodeIDs. The lock resource register in a lock requesting node stores responses from each of the remaining nodes as described later.

Figure 12B:
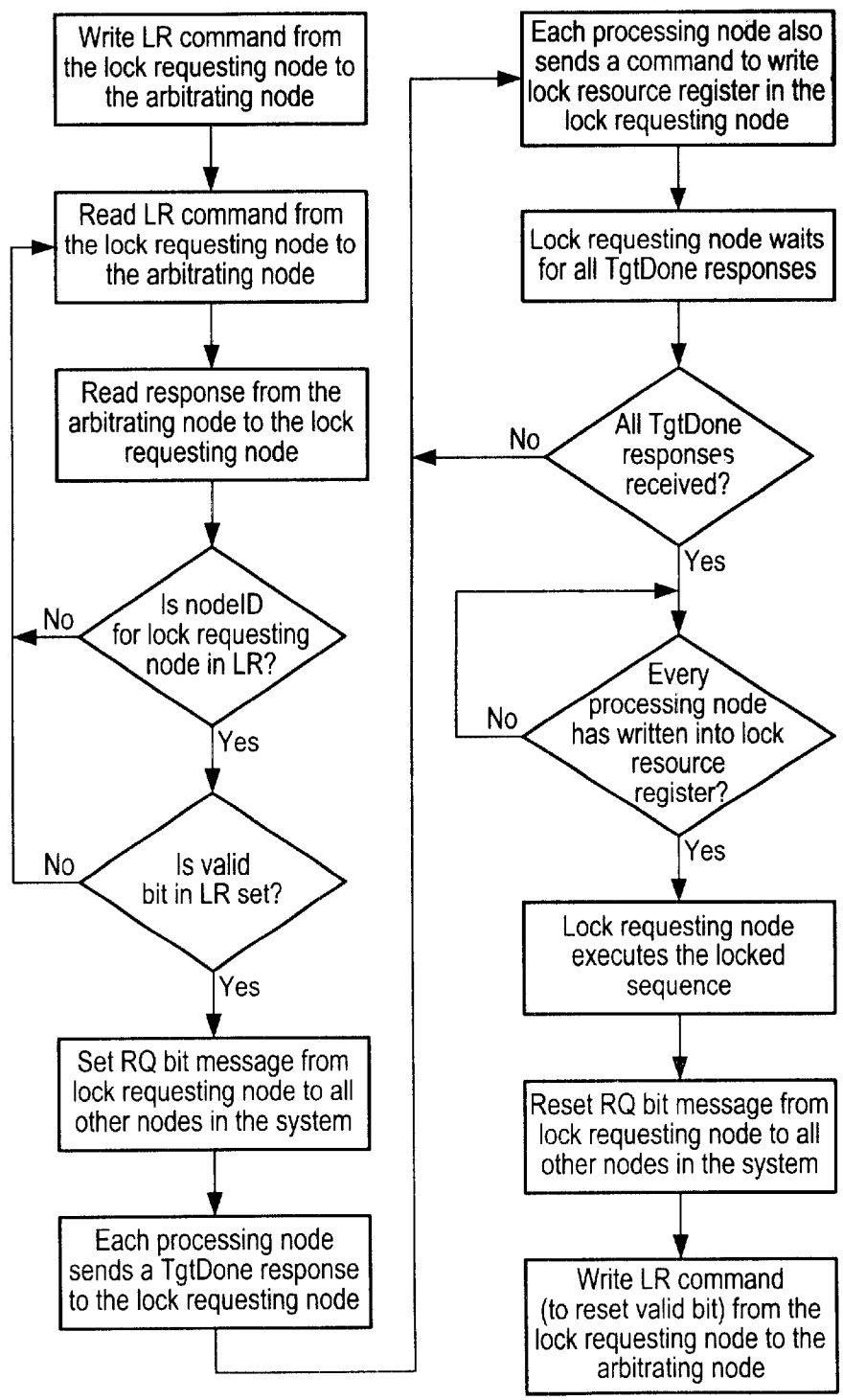
FIG. 12B shows an exemplary flowchart for the flow of packets in FIG. 12A.

Referring now to FIG. 12A, an example flow of packets during a lock transaction within the computer system of FIG. 9 is illustrated. However, each processing node has the circuit elements shown in FIG. 11. The arbitrating node (assumed to be node 22D) additionally includes the lock register 98, and may further include the lock request buffer 100 as shown in FIG. 9. To establish lock ownership, the microcode within the lock requesting node 72 transmits a write lock register (LR) command to write its node identification information within the LR 98 in the arbitrating node 70. The process of sending node identification information and reading the lock register until it contains NodeID of the lock requesting node 72 with valid bit set is similar to the one described with reference to the packet flow diagram in FIG. 10A. A comparison of FIGS. 10B and 12B also points out this similarity.

After the arbitrating node 70 places the lock request from the lock requesting node 72 into service (as indicated by the valid bit set in the read response from the arbitrating node 70 conveying content of the lock register 98), the lock requesting node 72 transmits a set release request bit (RQ bit) message to each remaining nodes 70, 74 and 76 as indicated by the 'Broadcast Message(1)' arrow in FIG. 12A. In one embodiment, each recipient node may send a target done response (not shown in FIG. 12A) to the lock requesting node 72 upon setting the RQ bit therein as discussed earlier with reference to FIG. 10A. The lock requesting node 72 waits for each target done response. Further, due to the absence of the RP (release response) bit in each processing node, the lock requesting node 72 may not send the read RP bit commands discussed earlier with respect to FIG. 10A. Instead, the microcode in each remaining processing node (i.e., nodes 70, 74 and 76) may transmit a write lock resource register (LRR) command with the data packet containing the node identification of the sender node. The write command may be transmitted along with or after the transmission of the target done message in response to the set RQ bit command from the lock requesting node 72.

Further, the node identification data is transmitted through the write LRR command when the sender node is ready to release shared system resources, i.e., for example, when the sender node has ceased issuing transactions within the system and can receive all responses for outstanding transactions. The write LRR command may be similar to the Write(sized) packet 80 in FIG. 8A (with or without a defined Lock bit), and the respective node identification data may be transmitted through a data packet (that follows the write command packet) which may be similar to the data packet 50 in FIG. 5. The microcode in the lock requesting node 72 may be configured to wait for node identification data from each remaining node to be written into the lock resource register 124. When the lock resource register is full with currently-received node identification data from each remaining node in the system, the lock requesting node 72 (through its microcode) gets an indication that the lock has been established and it is free to commence execution of locked sequence.

After completion of lock operations, the microcode in the lock requesting node may release the lock. The lock release procedure (depicted in FIGS. 12A and 12B) is similar to that described with reference to FIGS. 10A and 10B. However, due to the absence of RP bits, the remaining processing nodes 70, 74 and 76 may reset corresponding RQ bits only. In one embodiment, the microcode in the lock requesting node 72 clears the lock resource register upon completion of lock operations. This may assure that the lock requesting node 72 reads only valid node identification data whenever it next establishes the lock.

It is noted that the control packets (including command packets and response packets) and the data packets described herein may be implemented using different formats and encodings. The present messaging schemes may also be implemented in a multiprocessing system configuration that is different from that shown in FIGS. 2A and 9. Further, any processing node may be a lock requesting node. However, only one processing node may function as an arbitrating node.

The foregoing discloses different embodiments of a messaging scheme to perform lock transaction within a distributed-memory multiprocessing computer system. The present messaging scheme allows for synchronization of processes within a multiprocessing system, but without restricting scalability of the system. Locks may be established without resource contentions or deadlocks among processing nodes. The dual-unidirectional link interconnect architecture may accommodate high-speed packet transmissions among the processing nodes and may allow for end-to-end acknowledgement of command and response packets travelling in the system. Microcode implementation of lock acquisition and release may reduce lock management hardware within the multiprocessing environment.

While the invention is susceptible of various modifications and alternative forms, specific embodiments thereof are shown by way of examples in the drawings and are herein described in detail. It should be understood, however, that the drawings and detailed description thereto are not intended to limit the invention to the particular forms disclosed, but, on the contrary, the intention is to cover all such modifications, equivalents and alternatives as may fall within the spirit and scope of the present invention as defined by the appended claims.

What is claimed is:

1. In a multiprocessing computer system comprising a plurality of processing nodes interconnected through an interconnect structure, wherein said plurality of processing nodes includes a first processing node, a second processing node and a third processing node, a method of establishing lock ownership for said first processing node comprising:

placing first processing node identification data into a lock register in said second processing node, wherein the lock register indicates which of the plurality of processing nodes, if any, is permitted exclusive access to one or more shared system resources by the second processing node;

ascertaining validity of said first processing node identification data placed in said lock register; and issuing one or more messages from said first processing node to said second and said third processing nodes in response to said ascertaining said validity of said first processing node identification data.

2. The method of claim 1, wherein said one or more messages include a broadcast message.

3. The method according to claim 2, wherein said broadcast message instructs said second and said third processing nodes to set respective release request bit therein, thereby informing said second and said third processing nodes of a claim by said first processing node for said lock ownership.

4. The method as in claim 2, further comprising:

detecting release by said second and said third processing nodes of a plurality of system resources in response to said broadcast message, thereby establishing said lock ownership for said first processing node.

5. The method of claim 4, wherein said detecting said release of said plurality of system resources in response to said broadcast message comprises:

said first processing node reading status of a release response bit within a selected processing node, wherein said selected processing node includes one of the following: said second processing node, and said third processing node, wherein each of said second and said third processing nodes is configured to set respective release response bit in response to said broadcast message when ready to release a corresponding portion of said plurality of system resources; and said first processing node continuing said reading said status of said release response bit until release response bits in said second and said third processing nodes are set.

6. The method according to claim 5, wherein said first processing node reading said status of said release response bit comprises:

said first processing node transmitting a read command to said selected processing node;

said selected processing node sending a read response to said first processing node in response to said read command, wherein said read response contains said status of said release response bit; and said first processing node continuing said transmitting said read command until said read response from said selected processing node indicates said status of said release response bit as set.

7. The method as recited in claim 4, wherein said detecting said release of said plurality of system resources in response to said broadcast message comprises:

each of said second and said third processing nodes transmitting a message to said first processing node when ready to release a corresponding portion of said plurality of system resources; and said first processing node waiting for each said message, thereby detecting said release by said second and said third processing nodes of said plurality of system resources.

8. The method of claim 7, wherein said message writes a lock resource register within said first processing node with an identity of the processing node transmitting said message, thereby informing said first processing node of said release of said corresponding portion of said plurality of system resources.

9. The method according to claim 1, wherein said one or more messages include:

a first write command from said first processing node to said second processing node; and a second write command from said first processing node to said third processing node.

10. The method as in claim 1, wherein said placing said first processing node identification data into said lock register comprises:

said first processing node sending said first processing node identification data to said second processing node to be written into said lock register;

said second processing node placing said first processing node identification data in a queue; and said second processing node transferring said first processing node identification data from said queue into said lock register upon determining said first processing node identification data to be least recently placed in said queue.

11. The method of claim 1, wherein said ascertaining said validity of said first processing node identification data comprises:

transmitting a read command from said first processing node to said second processing node to read content of said lock register;

sending a read response from said second processing node to said first processing node, wherein said read response contains said content of said lock register; and continuing said transmitting said read command and said sending said read response until said content of said lock register includes: said first processing node identification data, and a valid bit identifying said first processing node identification data to be valid.

12. In a multiprocessing computer system comprising a plurality of processing nodes interconnected through an interconnect structure, wherein said plurality of processing nodes includes a first processing node having ownership of a lock, a second processing node, and a third processing node, a method whereby said first processing node releases said ownership of said lock comprising:

said first processing node invalidating a node identification data thereof stored in a lock register within said second processing node, wherein the lock register indicates which of the plurality of processing nodes, if any, is permitted exclusive access to one or more shared system resources by the second processing node; and said first processing node issuing one or more messages to said second and said third processing nodes.

13. The method of claim 12, wherein said one or more messages include a broadcast message.

14. The method as in claim 13, wherein said broadcast message informs said second and said third processing nodes of release of said ownership of said lock.

15. The method of claim 13, wherein said broadcast message instructs said second and said third processing nodes to reset respective release request bit therein, thereby informing said second and said third processing nodes of release of said ownership of said lock.

16. The method according to claim 13, further comprising:

each of said second and said third processing nodes sending a corresponding target done message to said first processing node in response to said broadcast message.

17. The method according to claim 12, wherein said one or more messages include:

a first write command from said first processing node to said second processing node; and a second write command from said first processing node to said third processing node.

18. A multiprocessing computer system comprising:

a plurality of processing nodes interconnected through an interconnect structure, wherein said plurality of processing nodes comprises:

a first processing node configured to transmit a first write command as part of establishing therefor ownership of a lock, wherein said first write command conveys first processing node identification data; and a second processing node comprising a lock register including:

a nodeID field, wherein said nodeID field stores said identification data for one of said plurality of processing nodes, and a valid bit to indicate validity of said identification data in said nodeID field, wherein said valid bit when set identifies said one of said plurality of processing nodes as having current ownership of said lock, wherein said second processing node is configured to receive and process said first write command to determine when to place said first processing node identification data into said nodeID field.

19. The multiprocessing computer system according to claim 18, wherein said second processing node further comprising:

a lock request buffer to store said first processing node identification data until said second processing node places said first processing node identification data into said nodeID field.

20. The multiprocessing computer system as in claim 19, wherein said lock request buffer includes a storage space to store said identification data for n−1 processing nodes, wherein n is the total number of processing nodes in said plurality of processing nodes.

21. The multiprocessing computer system of claim 19, wherein said second processing node is configured to place said first processing node identification data into said nodeID field upon determining pendency status of said first processing node identification data in said lock request buffer to be least recent.

22. The multiprocessing computer system according to claim 18, wherein said first processing node is configured to iteratively read said lock register until said nodeID field has said first processing node identification data and said valid bit is set.

23. The multiprocessing computer system as in claim 18, wherein each of said plurality of processing nodes comprises:

a release request bit, wherein said first processing node is configured to transmit a first broadcast message instructing each remaining processing node in said plurality of processing nodes to set said release request bit therein.

24. The multiprocessing computer system according to claim 23, wherein said each remaining processing node is configured to transmit a target done message to said first processing node in response to said first broadcast message.

25. The multiprocessing computer system of claim 23, wherein said each of said plurality of processing nodes further comprises:

a release response bit, wherein said each remaining processing node is configured to set said release response bit when ready to release a corresponding portion of a plurality of system resources to establish said ownership of said lock for said first processing node, and wherein said each remaining processing node is further configured to set said release response bit on/after setting said release request bit.

26. The multiprocessing computer system according to claim 25, wherein said first processing node is configured to iteratively and sequentially read said release response bit within said each remaining processing node until said each remaining processing node sets corresponding release response bit.

27. The multiprocessing computer system as in claim 23, wherein said first processing node comprises:

a lock resource register, wherein said each remaining processing node in said plurality of processing nodes is configured to transmit a corresponding second write command to said first processing node to write therein respective identification data for said each remaining processing node.

28. The multiprocessing computer system of claim 27, wherein said first processing node is configured to transmit a corresponding target done message to said each remaining processing node in response to said corresponding second write command from said each remaining processing node.

29. The multiprocessing computer system as in claim 23, wherein said first processing node is configured to transmit a second write command to said second processing node after completion of lock operations, wherein said second write command instructs said second processing node to reset said valid bit.

30. The multiprocessing computer system according to claim 29, wherein said first processing node is further configured to transmit a second broadcast message to said each remaining processing node after said completion of said lock operations, wherein said second broadcast message instructs said each remaining processing node to reset said release request bit therein.

31. The multiprocessing computer system of claim 30, wherein said each remaining processing node is configured to transmit a corresponding target done message to said first processing node in response to said second broadcast message.

32. The multiprocessing computer system as in claim 18, wherein said interconnect structure includes a plurality of dual-unidirectional links.

33. The multiprocessing computer system according to claim 32, wherein each dual-unidirectional link in said plurality of dual-unidirectional links interconnects a respective pair of processing nodes from said plurality of processing nodes.

34. The multiprocessing computer system of claim 32, wherein each dual-unidirectional link in said plurality of dual-unidirectional performs packetized information transfer and includes a pair of unidirectional buses comprising:
   a transmission bus carrying a first plurality of binary packets; and
   a receiver bus carrying a second plurality of binary packets.

35. The multiprocessing computer system as recited in claim 18, wherein each of said plurality of processing nodes includes:
   a plurality of circuit elements comprising:
      a processor core,
      a cache memory, and
      a memory controller; and
   a plurality of interface ports, wherein each of said plurality of circuit elements is coupled to at least one of said plurality of interface ports.

36. The multiprocessing computer system of claim 35, wherein said plurality of circuit elements further includes:
   a bus bridge;
   a graphics logic;
   a bus controller; and
   a peripheral device controller.

37. The multiprocessing computer system according to claim 35, wherein at least one of said plurality of interface ports in said each of said plurality of processing nodes is connected to a corresponding one of said plurality of dual-unidirectional links.

38. The multiprocessing computer system of claim 18, further comprising:
   a plurality of system memories; and
   a plurality of memory buses, wherein each of said plurality of system memories is coupled to a corresponding one of said plurality of processing nodes through a respective one of said plurality of system buses.

39. In a system comprising a plurality of nodes, a first node of the plurality of nodes comprising circuitry configured to acquire a lock in the system for the first node, wherein the circuitry is configured to transmit a write command to a lock register located in a second node of the plurality of nodes to begin acquiring a lock, and wherein the circuitry is configured to transmit one or more read commands to read the lock register to verify that the first node is permitted, by the second node, to acquire the lock.

40. The first node as recited in claim 39 wherein the circuitry comprises a processor including microcode, the processor executing the microcode to transmit the write command and the one or more read commands.

41. The first node as recited in claim 39 wherein the circuitry is further configured to transmit a first one or more commands to each other node of the plurality of nodes to update a release request indication to indicate a request for release of one or more shared system resources corresponding to the lock.

42. The first node as recited in claim 41 wherein the first one or more commands is a single broadcast command.

43. The first node as recited in claim 41 wherein the first one or more commands comprise write commands to each other node.

44. The first node as recited in claim 41 wherein the circuitry is further configured to transmit second one or more read commands to each other node to read a release response indication in each other node, wherein the release response indication indicates whether or not the other node has released the shared system resources.

45. The first node as recited in claim 41 wherein the circuitry comprises a lock resource register comprising indications corresponding to each other node, wherein the circuitry is configured to update the indication corresponding to a particular node in response to a write command from the particular node, the indication indicative of whether or not the particular node has released the shared system resources.

46. The first node as recited in claim 41 wherein the circuitry is further configured to transmit a third one or more commands to each other node to update the release request indication in each other node to note indicate the request for release.

47. The first node as recited in claim 46 wherein the third one or more commands is a single broadcast command.

48. The first node as recited in claim 46 wherein the third one or more commands comprise write commands to each other node.

49. The first node as recited in claim 46 wherein the circuitry is further configured to transmit a fourth write command to the lock register to release the lock indicated therein.

50. In a system comprising a plurality of nodes, a first node of the plurality of nodes comprising:
   a storage device configured to store a release request indication indicative of whether or not a second node is requesting that the first node release one or more shared system resources; and
   circuitry coupled to the storage device, wherein the circuitry is configured, responsive to the release request indication indicating that the second node is requesting release, to inhibit requests by the first node to the one or more shared system resources.

51. The first node as recited in claim 50 wherein the circuitry comprises a processor including microcode, the processor executing the microcode responsive to the release request indication indicating that the second node is requesting release.

52. The first node as recited in claim 50 wherein the storage device is further configured to store a release response indication indicative of whether or not the second node has released the one or more shared system resources, and wherein the circuitry is configured to update the release response indication to indicate that the second node has release the one or more shared system resources.

53. The first node as recited in claim 50 wherein the circuitry is configured to transmit a write command to the second node to update a lock resource register therein in response to releasing the one or more shared system resources.

54. The first node as recited in claim 50 wherein the circuitry is configured to permit requests by the first node to the one or more shared system resources responsive to an update of the release request indication to indicate that the second node is not requesting release of the one or more system resources.

* * * * *